United States Patent [19]
Sugita et al.

[11] Patent Number: 5,196,689
[45] Date of Patent: Mar. 23, 1993

[54] DEVICE FOR DETECTING AN OBJECT INCLUDING A LIGHT-SENSITIVE DETECTING ARRAY

[75] Inventors: Keizo Sugita; Shunei Saito; Akira Tajiri; Hitoshi Kaneko; Iwao Okamura; Kentaro Ishizuka, all of Tokyo, Japan

[73] Assignee: Pioneer Electronic Corporation, Tokyo, Japan

[21] Appl. No.: 775,134

[22] Filed: Oct. 11, 1991

[30] Foreign Application Priority Data

Oct. 16, 1990 [JP] Japan ............................. 2-108354[U]
Jul. 26, 1991 [JP] Japan ............................. 3-208847
Jul. 26, 1991 [JP] Japan ............................. 3-208848

[51] Int. Cl.$^5$ ........................................... H01J 40/14
[52] U.S. Cl. ................................. 250/206.1; 250/221; 250/203.3
[58] Field of Search ............... 250/561, 221, 222.1, 250/201.8, 203.3, 203.7, 203.6, 203.4, 208.2, 206.1, 206.2, 206.3; 356/141, 152, 1, 4

[56] References Cited

U.S. PATENT DOCUMENTS

| | | | |
|---|---|---|---|
| 2,442,690 | 6/1948 | Hoffman et al. | 250/221 |
| 3,670,167 | 6/1972 | Forbes | 250/221 |
| 3,824,392 | 7/1974 | Tibbling | 250/221 |
| 3,825,748 | 7/1974 | Van Wandelen | 250/221 |
| 4,306,147 | 12/1981 | Fukuyama et al. | 250/221 |
| 4,317,992 | 3/1982 | Stauffer | 250/221 |
| 4,698,511 | 10/1987 | Sueda et al. | 250/561 |
| 4,965,453 | 10/1990 | Hoschette et al. | 250/203.3 |
| 5,023,440 | 6/1991 | Kuppenheimer, Jr. | 250/203.6 |
| 5,081,345 | 1/1992 | Grenier et al. | 356/141 |

FOREIGN PATENT DOCUMENTS 61-42169 3/1986 Japan.

*Primary Examiner*—David C. Nelms
*Attorney, Agent, or Firm*—Sughrue, Mion, Zinn, Macpeak & Seas

[57] ABSTRACT

A device for detecting an object by detecting an infrared ray emitted from a moving object. The device includes a plurality of light receiving elements, each being disposed so as to receive infrared rays at a predetermined directional optical angle, and the position of and distance to the object is detected based on detection results by the respective light receiving elements. The moving speed and acceleration of the object are also detected from detection results by the respective light receiving elements, taking time-varying factors into consideration.

12 Claims, 21 Drawing Sheets

DEVICE FOR DETECTING AN OBJECT INCLUDING A LIGHT-SENSITIVE DETECTING ARRAY

FIELD OF THE INVENTION

This invention relates to a device for detecting an object, which detects the position and moving speed of the object, the distance to the object, and the like.

BACKGROUND OF THE INVENTION

"Karaoke" systems with video disk reproduction are popular in recent years.

Such "karaoke" systems provide not only accompaniment of a requested music but also reproduce a video image matching o with the music. Some of these systems are provided with a video camera so that the video camera takes the picture of a singer and reproduces the picture on a TV screen.

By the way, when the video camera takes the picture of a singer (an object to be detected; hereinafter referred to simply as "object") who sings with "karaoke", the object may move frequently. In such a case, if the video camera is fixed, the object may step out of the imaging area of the camera, thereby not permitting accurate monitoring of the picture.

To overcome this shortcoming, a cameraman who operates the video camera must be involved. However, the "karaoke" systems are generally installed in restaurants, bars, or the like, and the cameraman following the object in the shop throughout the music bothers other guests, which is a large inconvenience.

To overcome such inconvenience, an imaging device for tracking an object (hereinafter referred to simply as "imaging device") such as shown in FIG. 1 has been proposed in, e.g., Japanese Patent Unexamined Publication No. 42169/1986.

As shown in FIG. 1, a video camera 2 is mounted on a stand 1 of the imaging device. A position detector 4 having an infrared light receiving lens 3 is mounted on the video camera 2.

On the other hand, an infrared light projecting unit 7 is provide on a shoulder 6 of an object 5.

The principle of detecting the position of the object 5 by the thus constructed imaging device is as shown in FIG. 2. That is, infrared light receiving units 7A to 7D are disposed so as to cross on a plane I. A plane II shows an area over in which the object 5 moves. When the level of the detected infrared light of, e.g., the infrared light receiving unit 7C or 7D is increased as the object 5 has moved, the movement of the object 5 is detected in an X-axis direction on the plane II. As a result, the stand 1 causes the video camera 2 to move in the X-axis direction, so that the object 5 is automatically tracked.

As a result of the construction, the automatic tracking of the object 5 contributes to dismissing the cameraman and dispenses with inconveniences of operating the video camera even in the case where a "karaoke" system is installed in a small space.

However, in the aforesaid conventional imaging device the optical axis L or R of the infrared light receiving unit 7D or 7C on the X axis in FIG. 2 is arranged so as to extend in parallel to each other as shown in, e.g., FIG. 3. This makes the areas A, B, C of the light receiving plane different as shown in FIG. 4, thereby causing errors in detecting the object 5, not allowing correct tracking of the object 5.

Further, with respect to the distance information of a background, an image to be obtained by a video camera is two-dimensional just like a photograph, while the actual background is three-dimensional.

Incidentally, a man collects distance information from subtle differences of two images visualized by two eyes. Similarly, in an artificial vision, three-dimensional information collected from two images obtained by two cameras is called "binocular stereoscopic vision". Having the problem of taking too much time in image processing such as obtaining points corresponding to the two images, there is no such artificial vision that has so far been put to practical use.

A technique that is often employed is to inject a slit light beam or spot light beam obliquely to a background or the like and obtain the information from horizontal deviations of optical points from the background or the like within the image. A device used for this is called a range finder.

However, in this technique, the distance information varies depending on the point onto which the slit light beam or spot light beam is injected, thereby causing conspicuous errors in distance detection. The tracking of a moving object is difficult, thus leading to errors in distance detection or the like.

Further, a light receiving device 100 such as shown in FIG. 5 has heretofore been used as an infrared light receiving device. The light receiving unit 100 consists of a light receiving element 101 and an antenna 102. The antenna 102 is of a type such that infrared light rays are reflected from the light receiving element that is disposed at the center to increase the light receiving level and thereby increase the sensitivity.

However, such antenna 102 does not provide a consistent directivity pattern, exhibiting such a variation as shown in FIG. 6. To utilize the directivity of the light receiving element in place of the antenna 102, the light receiving element must be modified.

As shown in FIG. 6, the light receiving level exhibits a large fluctuation, and its directivity is not consistent. If two such light receiving units are disposed so as to cause their light receiving areas to overlap one upon the other, it is difficult to identify the position of a light projecting unit.

Further, as shown in FIG. 7, if antennas 103, 104 are disposed adjacent to each other so that the light receiving planes of two of their light receiving units overlap one upon the other, a dead zone 105 occurs due to the thicknesses of the antennas 103, 104. Thus, when infrared light rays from a light projecting unit are injected to the dead zone, such zone cannot be identified.

If each of the antennas 103, 104 is made thinner, it is difficult to mount a light receiving element 106.

SUMMARY OF THE INVENTION

The invention has been made in view of the above circumstances. Accordingly, an object of the invention is to provide a device for detecting an object, which is capable of detecting objects including a moving object correctly.

Another object of the invention is to provide both a light receiving unit that is free from variations in directivity level and a light receiving device that does not produce a dead zone into which no infrared light rays from a light projecting unit are injected when a plurality of light receiving units are disposed adjacent to one another.

To achieve the above object, a first aspect of the invention is applied to a device for detecting an object, which receives a light ray injected from the object by a light receiving element. In such a device, at least two light receiving elements are arranged and the light receiving angle of each light receiving element is provided so that a detection area in the light receiving plane is set to a predetermined area.

Further, each light receiving element is mounted on a reflector body having a slit and the detection area in the light receiving plane is equally divided by the slit.

Further, a second aspect of the invention is applied to a device for detecting an object, in which a light ray injected from the object is received by a light receiving element, such a device including: a plurality of light receiving means, each having a predetermined directional optical angle for receiving the infrared light ray; synthesized detection area judgment means for judging a synthesized detection area obtained by synthesizing the light receiving areas of the plurality of light receiving means based on detection results by the plurality of light receiving means; and distance judgment means for judging a distance to the object based on a judgment result by the synthesized detection area judgment means.

Further, a third aspect of the invention is applied to a device for detecting an object, in which the presence of the object is detected by detecting a light ray injected from the object, such device including: a plurality of light receiving means, each having a predetermined directional optical angle for receiving said infrared light ray; synthesized detection area judgment means for judging a synthesized detection area obtained by synthesizing light receiving areas of the plurality of light receiving means based on detection results by the plurality of light receiving means; and angular velocity judgment means for judging an angular velocity of the object based on a judgment result by the synthesized detection area judgment means.

Further, a fourth aspect of the invention is applied to a device for detecting an object, in which the presence of the object is detected by receiving a light ray injected from the object, such device including: a plurality of light receiving means, each having a predetermined directional optical angle for receiving the infrared light ray; synthesized detection area judgment means for judging a synthesized detection area obtained by synthesizing light receiving areas of the plurality of light receiving means based on detection results by the plurality of light receiving means; and angular acceleration judgment means for judging an angular acceleration to the object based on a judgment result by the synthesized detection area judgment means.

The device for detecting an object of the invention includes at least two light receiving elements, whose light receiving angle is provided so that a detection area in their light receiving plane is set as desired.

Therefore, by equally dividing the detection area of the light receiving plane, the detection levels at the respective areas can be maintained constant and detection errors can thereby be eliminated and position detection accuracy can be improved.

Further, in the device of the invention, when the synthesized detection area judgment means judges a synthesized detection area obtained by synthesizing the light receiving areas of the light receiving means by detection results by a plurality of light receiving means, the distance judgment means judges a distance to the object based on a judgment result by the synthesized detection area judgment means. Therefore, detection of the distance to the object using an infrared light ray, which has been considered impossible in the conventional art, can be implemented on, e.g., three levels: close, relatively close, and remote.

Further, the device of the invention allows the angular velocity of the object to be judged by the angular velocity judgment means. Since the angular velocity can be obtained easily, the application of the invention to, e.g., the tracking of an object by an imaging device such as a video camera allows correct and sure tracking of the object to be implemented.

Further, the device of the invention allows the angular acceleration of the object to be judged by the angular acceleration judgment means. Since the angular acceleration can be obtained easily, the application of the invention to, e.g., the tracking of an object by an imaging device such as a video camera allows quick tracking of the object to be implemented with respect to, e.g., a quickly moving object.

Further, a fifth aspect of the invention is applied to a device for receiving light rays. Such a device includes a plurality of light receiving units, each having the same directivity and being disposed adjacent to one another so that the light receiving ranges thereof overlap one upon the other.

Further, each light receiving unit has a non-reflecting antenna absorbing an infrared light ray and receives only a straight infrared light ray with a light receiving element disposed within the light receiving unit.

Further, each light receiving unit is so arranged that a portion surrounding the light receiving element is covered with a non-reflecting member absorbing an infrared light ray so as to receive only a straight infrared light ray from a light projecting unit and that a light receiving hole is disposed on the non-reflecting member.

Since the antenna is made of a mat or electronic wave absorbing member so that no infrared light ray is reflected and only a straight light ray is received by the light receiving element. As a result, a pattern whose light receiving levels are consistent, thereby improving the directivity and sensitivity of the light receiving unit.

Further, when two antennas are disposed so as to overlap one upon the other, it is so arranged that the light receiving angles overlap one upon the other so as to produce no dead zone. Therefore, a light receiving unit whose directivity levels are consistent can be obtained.

DETAILED DESCRIPTION OF THE PREFERRED EMBODIMENTS

Figure 2:
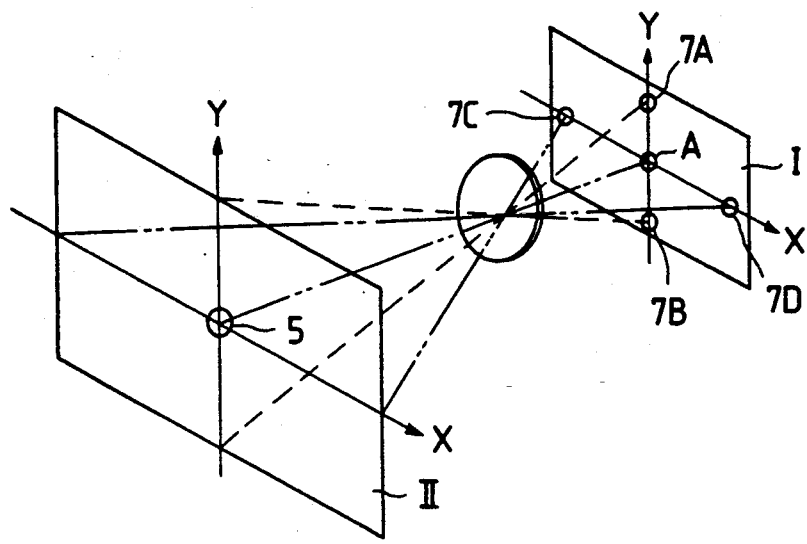
FIG. 2 is a diagram illustrative of the principle of detecting the position of the object by the FIG. 1 imaging device.
Figure 3:
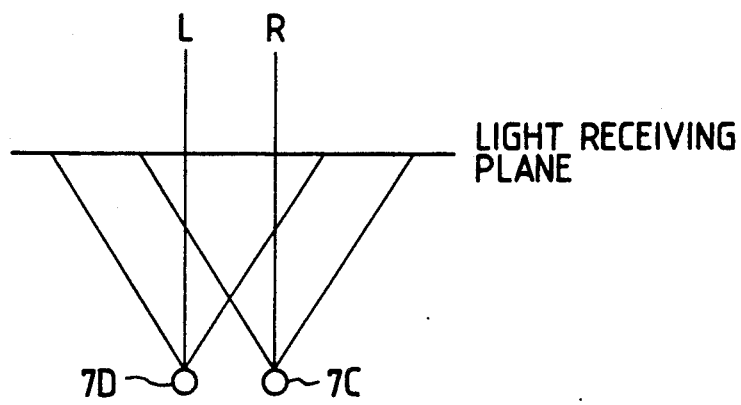
FIG. 3 is a diagram showing a state in which an infrared light receiving unit is installed.
Figure 4:
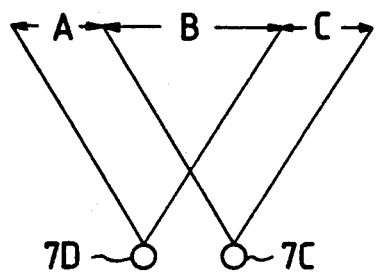
FIG. 4 is a diagram illustrative of the areas of a light receiving plane with the infrared light receiving unit installed.
Figure 5:
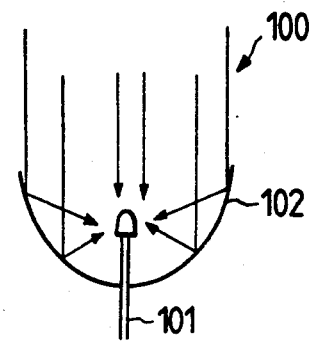
FIG. 5 is a diagram showing the construction of a conventional light receiving device.
Figure 6:
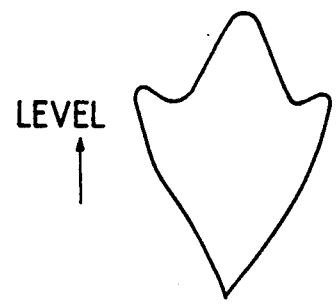
FIG. 6 is a diagram illustrative of the levels of the conventional light receiving device.
Figure 7:
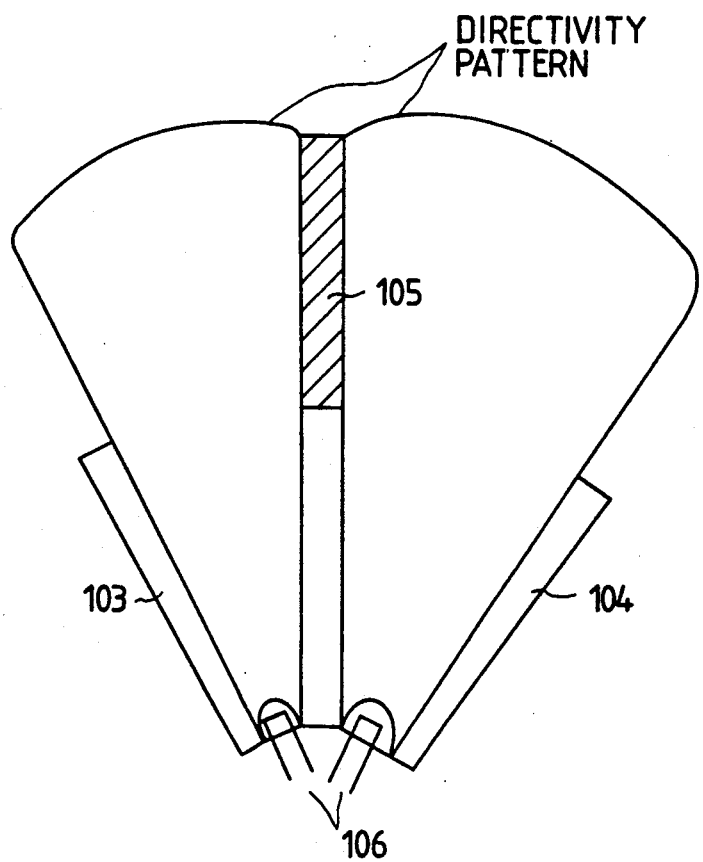
FIG. 7 is a diagram showing the construction of a conventional light receiving device.

Embodiments of the invention will hereunder be described with reference to the accompanying drawings. In the drawings, parts and components common to FIG. 2 are designated by the same reference numerals and their description will be omitted to avoid repetition.

Figure 8:
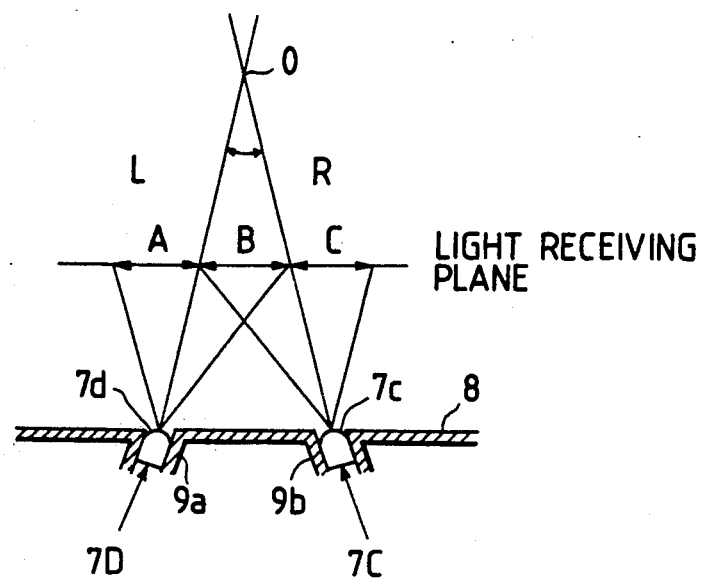
FIG. 8 is a diagram showing a device for detecting an object, which is an embodiment of the invention.

FIG. 8 shows a device for detecting the position of an object, which is an embodiment of the invention. A light receiving unit mounting member 8 includes positioning guides 9a, 9b. The light receiving elements 7d, 7c of infrared light receiving units 7C, 7D are mounted on the positioning guides 9a, 9b, respectively.

Here, the positioning guides 9a, 9b are disposed so that the optical axes L, R of the light receiving elements 7d, 7c can intersect at a point O and that the areas A, B, C on a light receiving plane are equal to one another.

Accordingly, the areas A, B, C satisfy the relation that $A=B=C$ and the area for the object is equally divided, making the detection levels constant.

Thus, in this embodiment it is so arranged that the optical axes L, R of the infrared light receiving units 7D, 7C are caused to intersect at the point 0 and that the area on the light receiving plane is divided into the equal areas A, B, C so as to make the detection levels of the respective areas constant. As a result, not only detection errors are eliminated, but also position detection accuracy can be improved.

Figure 9:
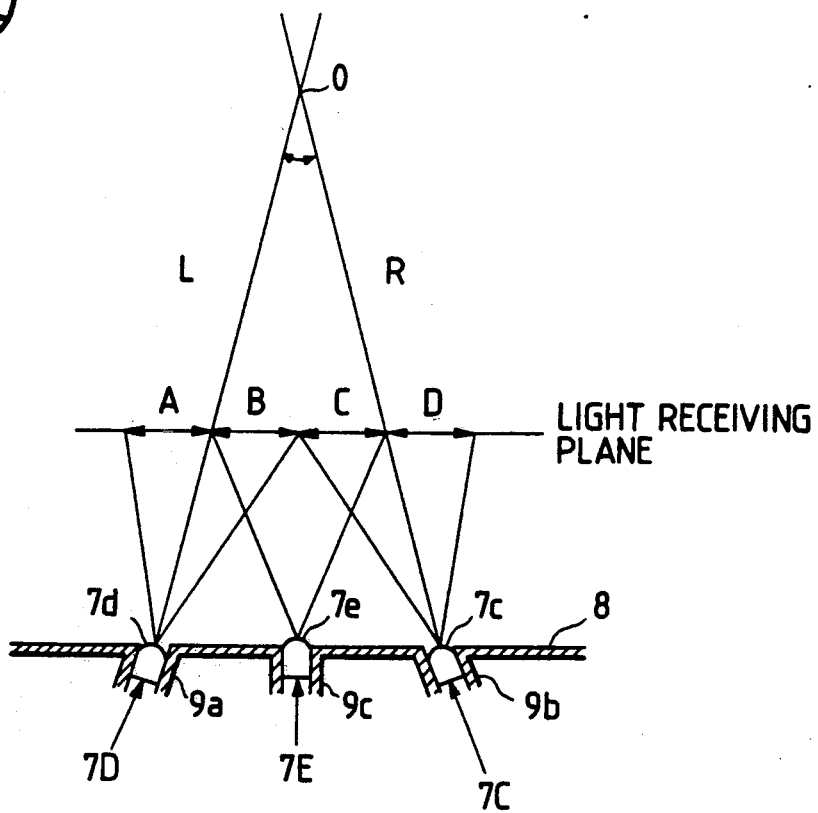
FIG. 9 is a diagram showing a modification of the embodiment of FIG. 8, in which three of the infrared light receiving units are used.

FIG. 9 shows another embodiment in which three infrared light receiving units are used. Parts and components common to those shown in FIG. 8 are designated by the same reference numerals in the following figures, and their description will be omitted.

As shown in FIG. 9, infrared light receiving units 7D, 7E, 7C are mounted on the positioning guides 9a to 9c of a light receiving mounting member 8.

Here, the positioning guides 9a to 9c are disposed so that the optical axes L, R of the light receiving elements 7d, 7c intersect at the point 0 and that the areas A, B, C, D of a light receiving plane are equal to one another.

Accordingly, the areas A, B, C, D satisfy the relation that $A=B=C=D$, so that the number of divided portions of the light receiving plane is increased, thereby further improving the position detection accuracy.

Thus, in this embodiment, the optical axes L, R of the infrared light receiving units 7C, 7D, 7E are caused to intersect at the point 0 and the areas A, B, C, D are made equal to one another. Therefore, the number of divided portions of the light receiving plane is increased, thereby contributing to improve accuracy in position detection.

Figure 10:
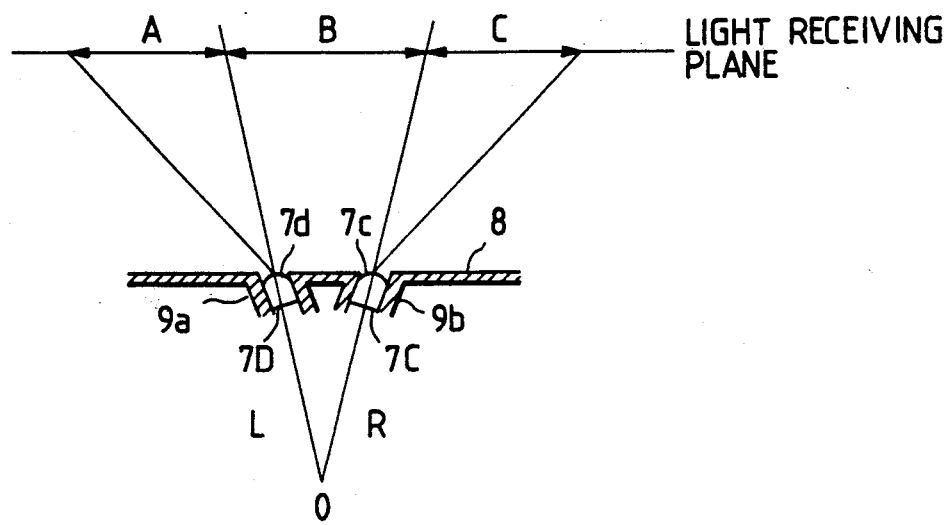
FIG. 10 is a diagram showing another modification of the embodiment of FIG. 8, in which the infrared light receiving units are installed differently.

FIG. 10 shows another embodiment in which the infrared light receiving units are mounted differently. The light receiving mounting member 8 includes the positioning guides 9a, 9b. On the positioning guides 9a, 9b are light receiving sections 7d, 7c of the infrared light receiving units 7D, 7C mounted, respectively.

Here, the positioning guides 9a, 9b, and thus the light receiving elements 7d, 7c, are positioned more closely to each other than those shown in FIG. 8, and the optical axes L, R of the respective light receiving sections 7c, 7d are oriented outward. The areas A, B, C of the light receiving plane satisfy the relation that A=B=C.

Accordingly, the areas A, B, C of the light receiving plane are similarly equal to one another, thereby improving position detection accuracy.

Thus, in this embodiment, the optical axes L, R of the infrared light receiving units 7C, 7D are not only oriented outward but also caused to intersect at the point O, and the areas A, B, C of the light receiving plane are made equal to each other, thereby similarly improving position detection accuracy.

Figure 11:
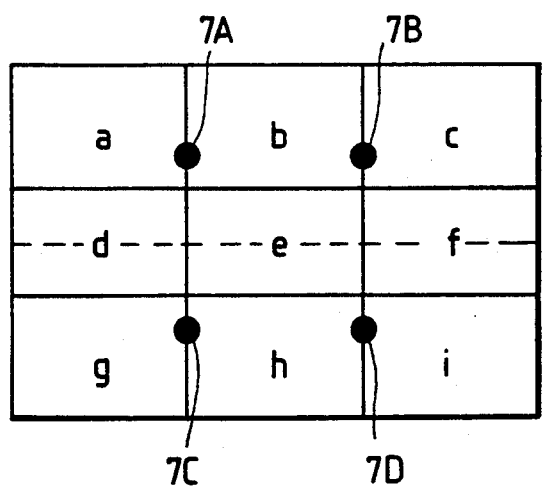
FIG. 11 is a diagram showing another modification of the embodiment of FIG. 8, in which the infrared light receiving units are installed differently.

FIG. 11 shows another embodiment in which the infrared light receiving units mounted differently. Four infrared light receiving units 7A to 7D are disposed equidistantly.

Since the four infrared light receiving units 7A to 7D are arranged equidistantly in this way, the infrared light receiving unit 7A can detect areas a, b, d, e; the infrared light receiving unit 7B can detect areas b, c, e, f; the infrared light receiving unit 7C can detect areas d, e, g, h; and the infrared light receiving unit 7D can detect areas e, f, h, i.

Accordingly, if, e.g., the infrared light receiving units 7A, 7B are detecting an object and the infrared light receiving units 7C, 7D are not detecting the object, it is judged that the object is placed in the area b.

Thus, in this embodiment the equidistant arrangement of the four infrared light receiving units 7A to 7D allows a total of 9 detection areas a to i to be obtained. As a result, not only the number of divided portions can be increased in the detection area, but also longitudinal detection is possible, thereby contributing to improving accuracy in detecting the position of an object.

Figure 12A:
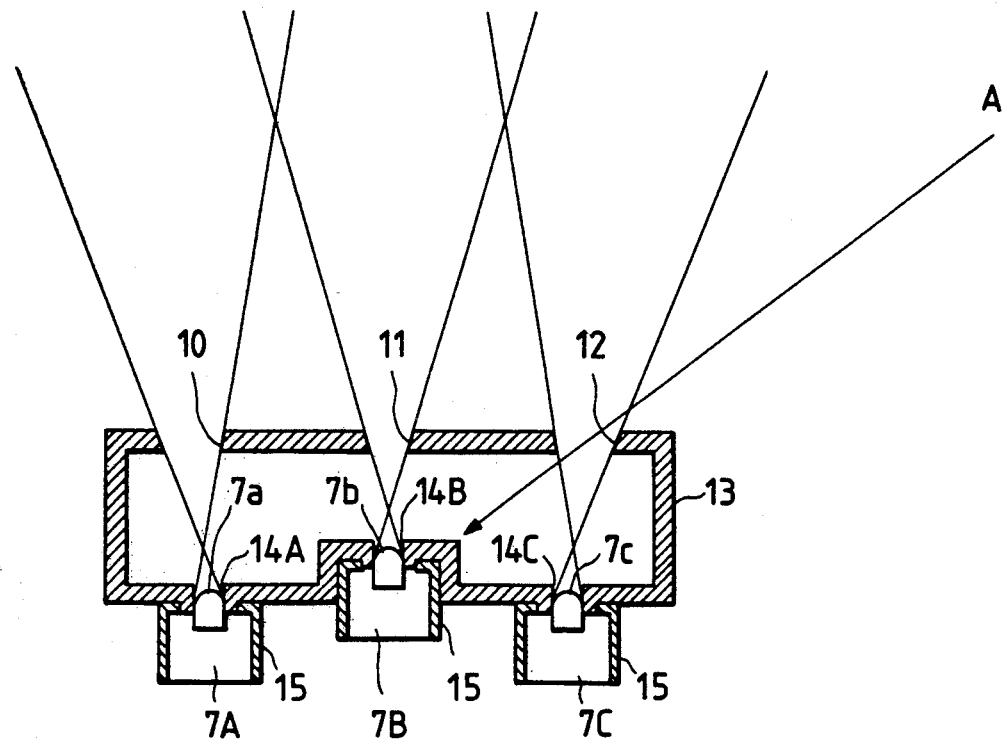
FIG. 12A is a diagram showing another modification of the embodiment of FIG. 8, in which the infrared light receiving units are installed differently.

FIG. 12A shows another embodiment in which the infrared light receiving units are installed differently. A reflector body 13 having slits 10, 11, 12 is arranged. The reflector body 13 includes positioning guides 14A, 14B, 14C. The positioning guide 14B, which is disposed in the middle, is protruding toward the interior of the reflector body 13 relative to the positioning guides 14A, 14C.

The light receiving elements 7a, 7b, 7c of the infrared light receiving units 7A, 7B, 7C held by a shield case 15 are mounted on the positioning guides 14A, 14B, 14C.

Accordingly, the light rays injected through the respective slits 10, 11, 12 are detected by the light receiving elements 7a, 7b, 7c of the infrared light receiving units 7A, 7B, 7C, respectively. No detection errors will be caused with this embodiment because it is so arranged, e.g., that the light ray injected from a point A that is outside the detection area does not reach the light receiving element 7b of the infrared light receiving unit 7B. Thus, detection accuracy can be improved.

Figure 12B:
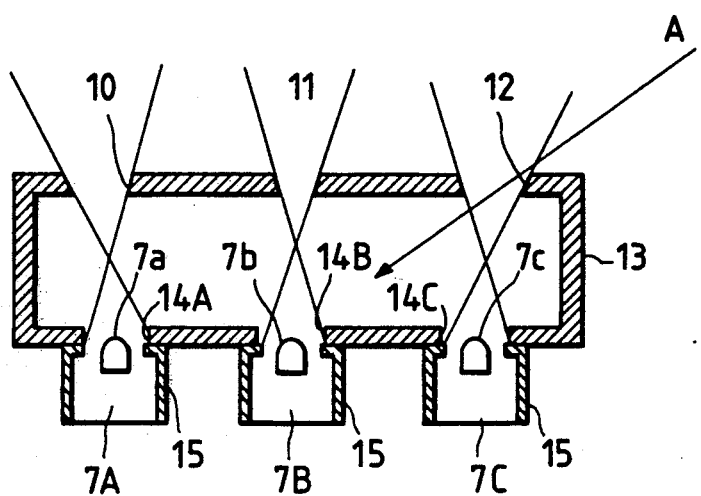
FIG. 12B is a diagram illustrative of an operation of the embodiment shown in FIG. 12A.

That is, if the positioning guides 14A, 14B, 14C of the reflector body 13 are arranged in same plane as shown in FIG. 12B, the light ray from the point A may reach the light receiving element 7b of the infrared light receiving unit 7B. As a result, in this case, detection errors are caused by the interference of the light ray outside the detection area.

Figure 13A:
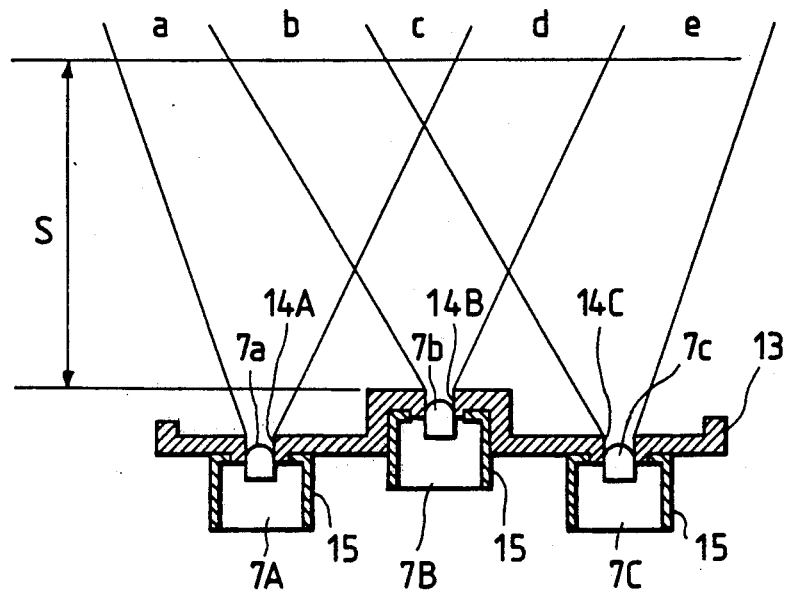
FIG. 13A is a diagram illustrative of an operation of D the embodiment shown in FIG. 12A.

Further, the arrangement of the positioning guide 14B so as to protrude toward the interior of the reflector body 13 relative to the positioning guides 14A, 14C allows an object, if such object is present at least within S as shown in, e.g., FIG. 13A, can be detected every area a, b, c, d, or e.

Figure 13B:
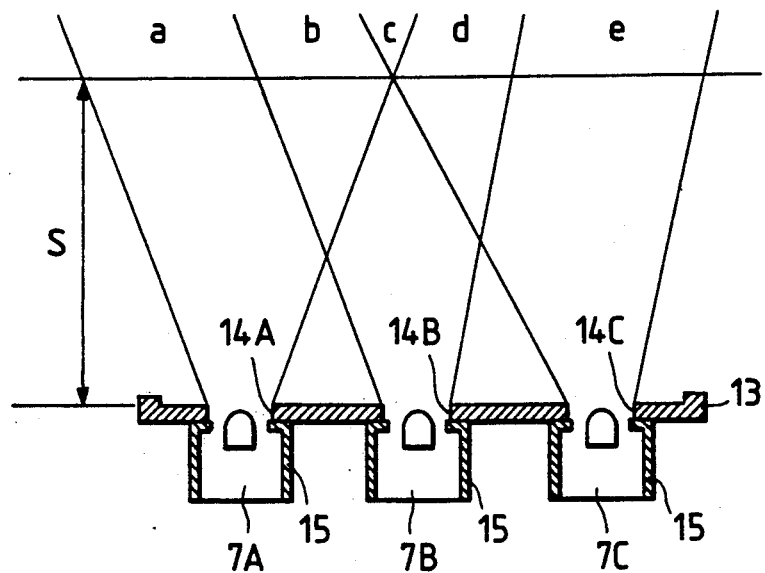
FIG. 13B is a diagram illustrative of an operation of the embodiment shown in FIG. 13A.

It is so arranged because, when the positioning guides 14A, 14B, 14C are disposed in the same plane and if an object is positioned within S, which is the same distance as that shown in FIG. 13A, then the object cannot be detected in the area c as shown in FIG. 13B.

Thus, in this embodiment the positioning guide 14B that positions in between the positioning guides 14A, 14C is arranged so as to protrude toward the interior of the reflector body 13 relative to the positioning guides 14A, 14C, so that the light rays from the point A does not reach the light receiving element 7b of the infrared light receiving unit 7B.

This impedes reception of light from without the detection area, thereby similarly eliminating detection errors and improving detection accuracy.

In addition, the positioning guide 14B is arranged so as to protrude toward the interior of the reflector body 13 relative to the positioning guides 14A, 14C. Thus, if an object is positioned at least within S, the object can be detected every area a, b, c, d, or e.

Figure 14:
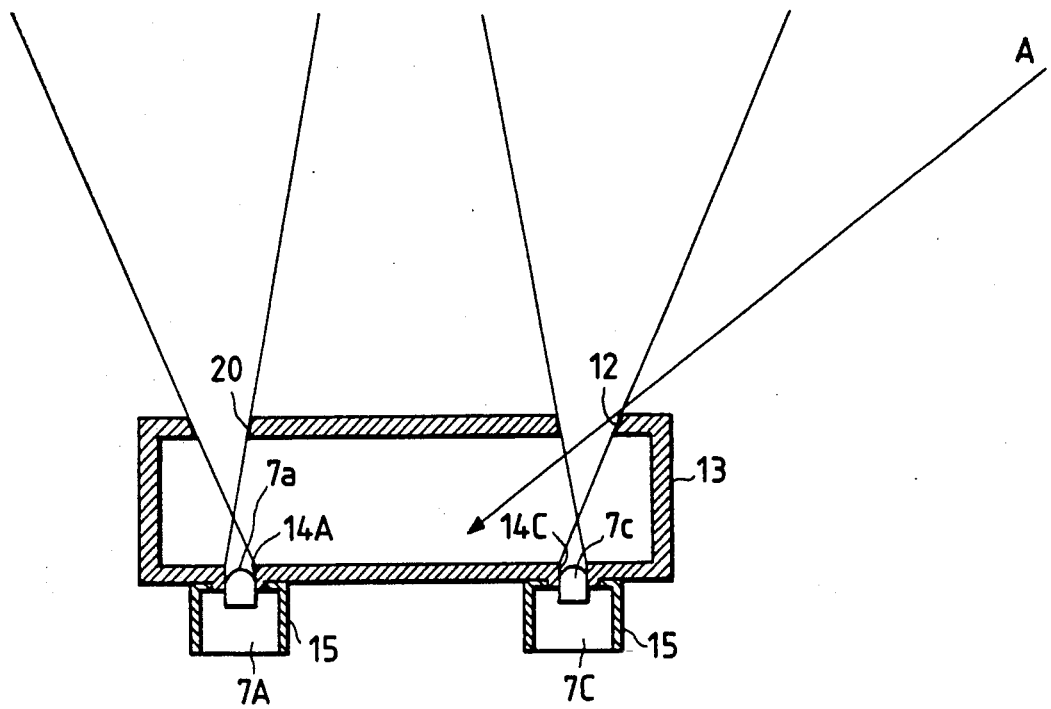
FIG. 14 is a diagram showing a modification of the embodiment of FIG. 12A, in which two infrared light receiving units are installed.

While a case where three infrared light receiving units 7A, 7B, 7C are arranged has been described in this embodiment, the application of the invention is not limited thereto. Only two units may instead be arranged, and in such a case, however, it is necessary to set the distance between the infrared light receiving units 7A, 7C so that the light rays from, e.g., a point A does not reach the infrared light receiving unit 7B as shown in FIG. 14.

Figure 15A:
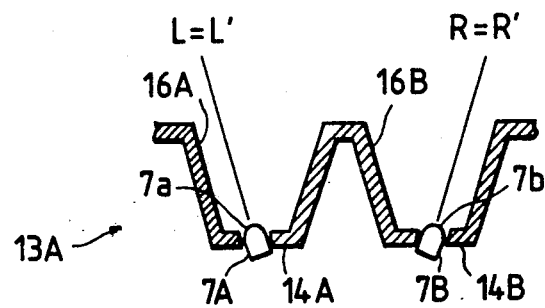
FIG. 15A is a diagram showing another embodiment in which the construction of a reflector body shown in FIG. 14 is modified.

FIG. 15A shows another embodiment in which the construction of the FIG. 12A reflector body 13 is modified.

As shown in FIG. 15A, parabola antenna-like light receiving units 16A, 16B are arranged on a reflector body 13A. Positioning guides 14A, 14B are disposed on the bottoms of the light receiving units 16A, 16B, respectively. The light receiving elements 7a, 7b of infrared light receiving units 7A, 7B are mounted on the positioning guides 14A, 14B.

Here, the light receiving elements 7a, 7b of the infrared light receiving units 7A, 7B are arranged so that the optical axes L, R of the light receiving elements 7a, 7b coincide with the central axes L', R' of the light receiving units 16A, 16B. As a result, an optical axis with the highest directivity out of the infrared light receiving units 7A, 7B can coincide with a central axis with the highest directivity out of the light receiving units 16A, 16B, thereby improving the light receiving sensitivity.

Figure 15B:
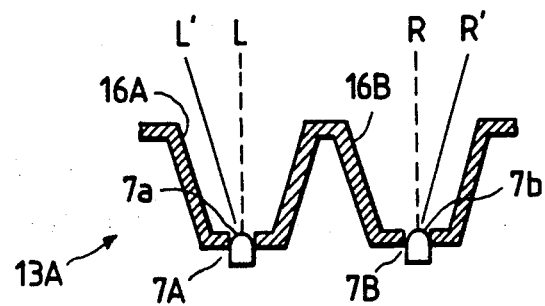
FIG. 15B is a diagram illustrative of an operation of the embodiment shown in FIG. 15A.

That is because, as shown in, e.g., FIG. 15B, if the light receiving units 16A, 16B of the infrared light receiving units 7A, 7B are arranged so that the optical axes of the respective light receiving elements 7a, 7b run in parallel to each other, the optical axes L, R do not coincide with the central axes L', R' of the respective light receiving units 16A, 16B.

Thus, since it is so arranged that the optical axes L, R of the light receiving elements 7a, 7b coincide with the central axes L', R' of the light receiving units 16A, 16B, respectively, in this embodiment, an optical axis with the highest directivity out of the infrared light receiving units 7A, 7B coincides with a central axis with the highest directivity out of the light receiving units 16A, 16B, thereby improving the light receiving sensitivity.

Figure 16:
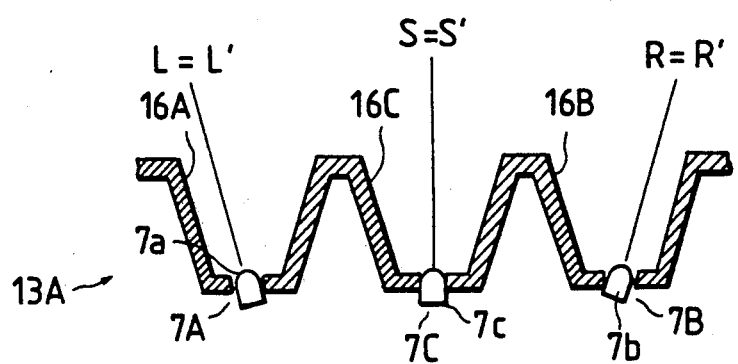
FIG. 16 is a diagram showing another embodiment in which three infrared light receiving units shown in FIG. 15A are installed.

While the case where two infrared light receiving units 7A, 7B are arranged on the reflector body 13A in this embodiment, the application of the invention is not limited to this embodiment. For example, as shown in FIG. 16, three infrared light receiving units 7A, 7B, 7C may be provided, and it may be arranged so that the optical axis of each of the units coincides with the optical axis of each of the light receiving units 16A, 16B, 16C. As a result, not only the light receiving sensitivity can be improved, but also the number of areas on the light receiving plane can be increased as already shown in FIG. 9.

Figure 17A:
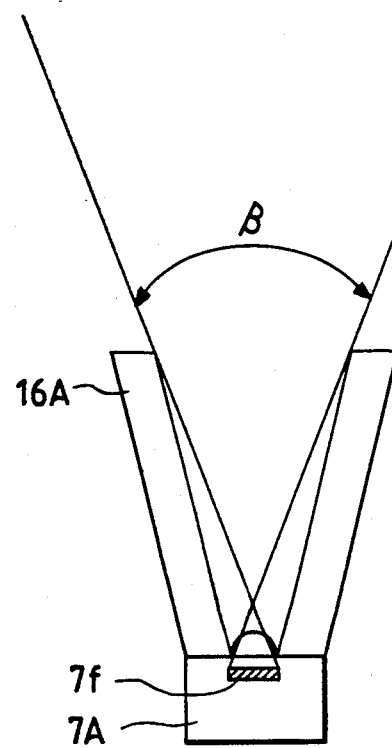
FIG. 17A is a diagram showing another embodiment in which the construction of the FIG. 15A light receiving unit is modified.

FIG. 17A shows another embodiment in which the construction of the light receiving unit shown in FIG. 16 is modified. The angle of opening of a light receiving unit 16A is set to $\beta$ that is a value based on the width of an IC chip 7f of an infrared light receiving unit 7A. This setting allows the light receiving plane to coincide with the actual light receiving area, thereby permitting accurate detection to be implemented.

Figure 17B:
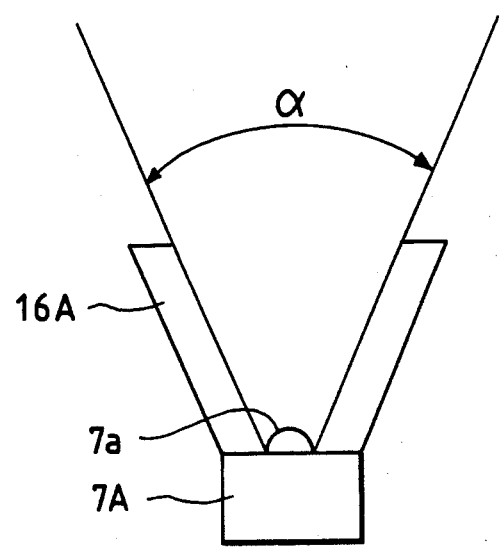
FIG. 17B is a diagram illustrative of an operation of the FIG. 17A light receiving unit.

That is because, as shown in FIG. 17B, it is understood that the setting of the angle of opening of the light receiving unit 16A to a value $\alpha$, which agrees with the angle of directivity of the light receiving section 7a of the infrared light receiving unit 7A, does not allow the light receiving plane to coincide with the detection area.

Thus, in this embodiment, the setting of the angle of opening of the light receiving unit 16A to the value $\beta$ that is based on the IC chip 7f of the infrared light receiving unit 7A causes the light receiving plane to coincide with the actual light receiving area, thereby permitting accurate detection to be implemented.

Figure 18:
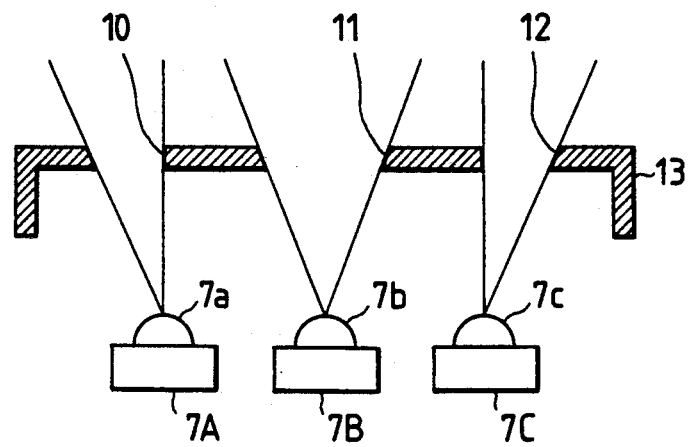
FIG. 18 is a diagram showing another embodiment in which the construction of the FIG. 17A reflector body is modified.

FIG. 18 shows another embodiment in which the construction of the reflector body 13 shown in FIG. 17A is modified.

As shown in FIG. 18, each of slits 10, 11, 12 of a reflector body 13 is opened so as to have a shape corresponding to each light receiving area, with a certain angle. These slits 10, 11, 12 are arranged relative to infrared light receiving units 7A, 7B, 7C so as to correspond to the light receiving areas, respectively.

As a result, the construction is extremely simple compared with the case where the light receiving sensitivity is improved with the parabola antenna-like light receiving unit 16A as shown in, e.g., FIG. 17A, thereby contributing to saving the fabrication cost. Reflection can be reduced as well.

Thus, in this embodiment each of the slits 10, 11, 12 of the reflector body 13 is arranged so as to have a shape corresponding to each light receiving area with a certain angle, and the slits 10, 11, 12 position relative to the infrared light receiving units 7A, 7B, 7C so as to correspond to the light receiving areas, respectively. Therefore, its construction is very simple, which permits economic fabrication to be implemented.

Therefore, such construction permits implementation of an inexpensive device for detecting an object as inexpensively as possible even if four or more infrared light receiving units 7A, 7B, 7C, ... are provided.

Figure 19:
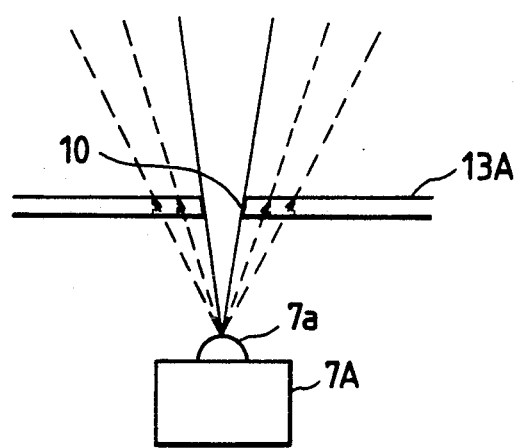
FIG. 19 is a diagram showing another embodiment in which the construction of the FIG. 18 slit is modified.

FIG. 19 shows another embodiment in which the construction of the slit is modified in the reflector body 13 shown in FIG. 18. A slit 10 is formed on a reflector body 13A. This reflector body 13A is moved horizontally on a time sharing basis. Further, an infrared light receiving unit 7A is disposed at an appropriate position on the reflector body 13A.

And as the slit 10 moves from one position to another due to the reflector body 13A moving on a time sharing basis, a plurality of light receiving areas are formed with only one infrared light receiving unit 7A.

Thus, in this embodiment the reflector body 13A having a single slit 10 is moved on a time sharing basis. Thus, a device for detecting an object can be implemented with only one infrared light receiving unit 7A.

While the case where the reflector body 13A is mechanically moved has been described with this embodiment, the application of the invention is not limited thereto. For example, a liquid crystal shutter may be disposed on the light receiving plane of the infrared light receiving unit 7A and change the light transmitting slit electrically.

Figure 20:
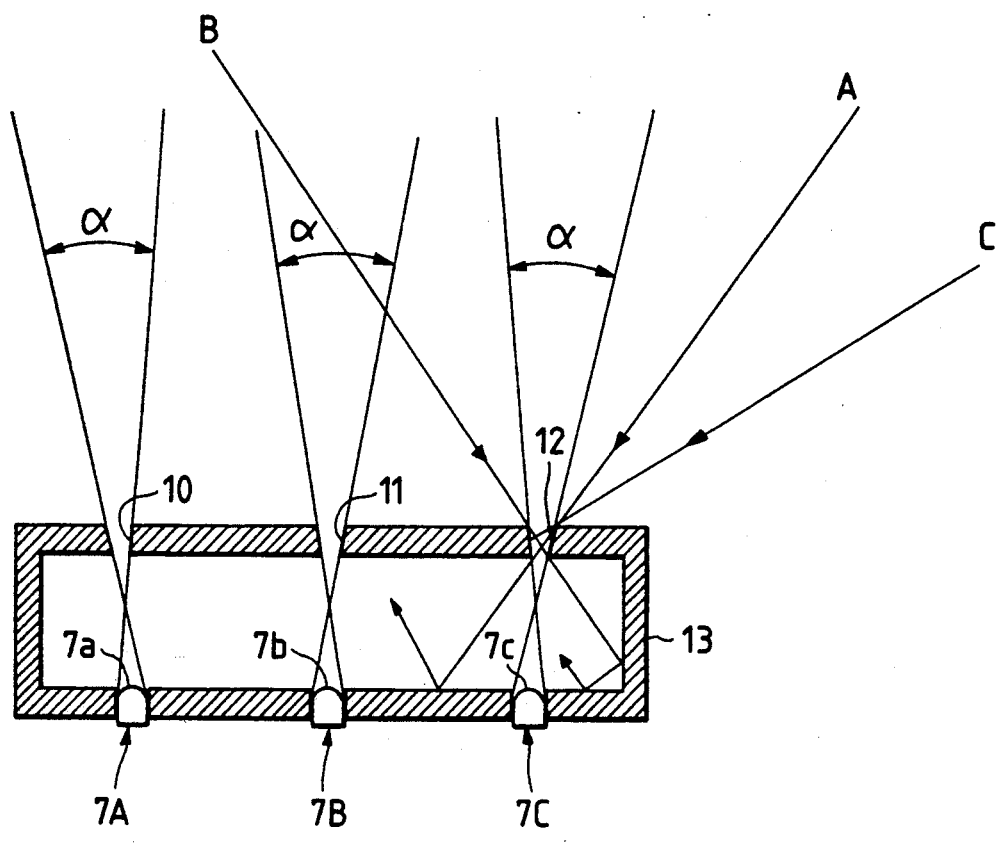
FIG. 20 is a diagram showing another embodiment in which the construction of the FIG. 18 reflector body is modified.

FIG. 20 shows another embodiment in which the construction of the reflector body 13 shown in FIG. 18 is modified. Slits 10, 11, 12 of the reflector body 13 are shaped so that, e.g., the light rays A, B, C injected from angles other than the angle of detection area $\alpha$ are not received by the light receiving section of the infrared light receiving unit 7C.

As a result, receiving of light rays from the area other than the detection areas can be blocked by the shape of the slits 10, 11, 12, thereby similarly contributing to improving detection accuracy.

Figure 21:
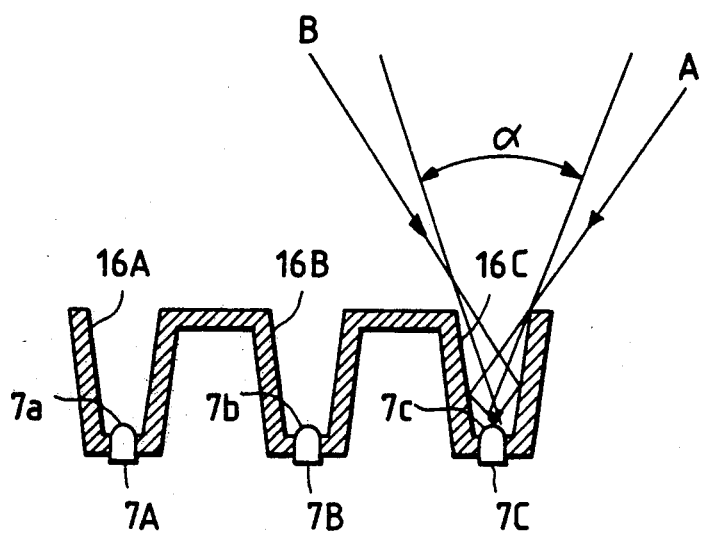
FIG. 21 is a diagram illustrative of an operation of the embodiment shown in FIG. 20.

That is because if the light receiving sections 7a, 7b, 7c of the infrared light receiving units 7A, 7B, 7C are mounted on the light receiving units 16A, 16B, 16C, then the light rays A, B, C injected from areas other than the angle of detection area $\alpha$ are received as shown in FIG. 21. When these rays from the non-detection area are received, detection errors are caused and thereby impair detection accuracy.

Figure 22:
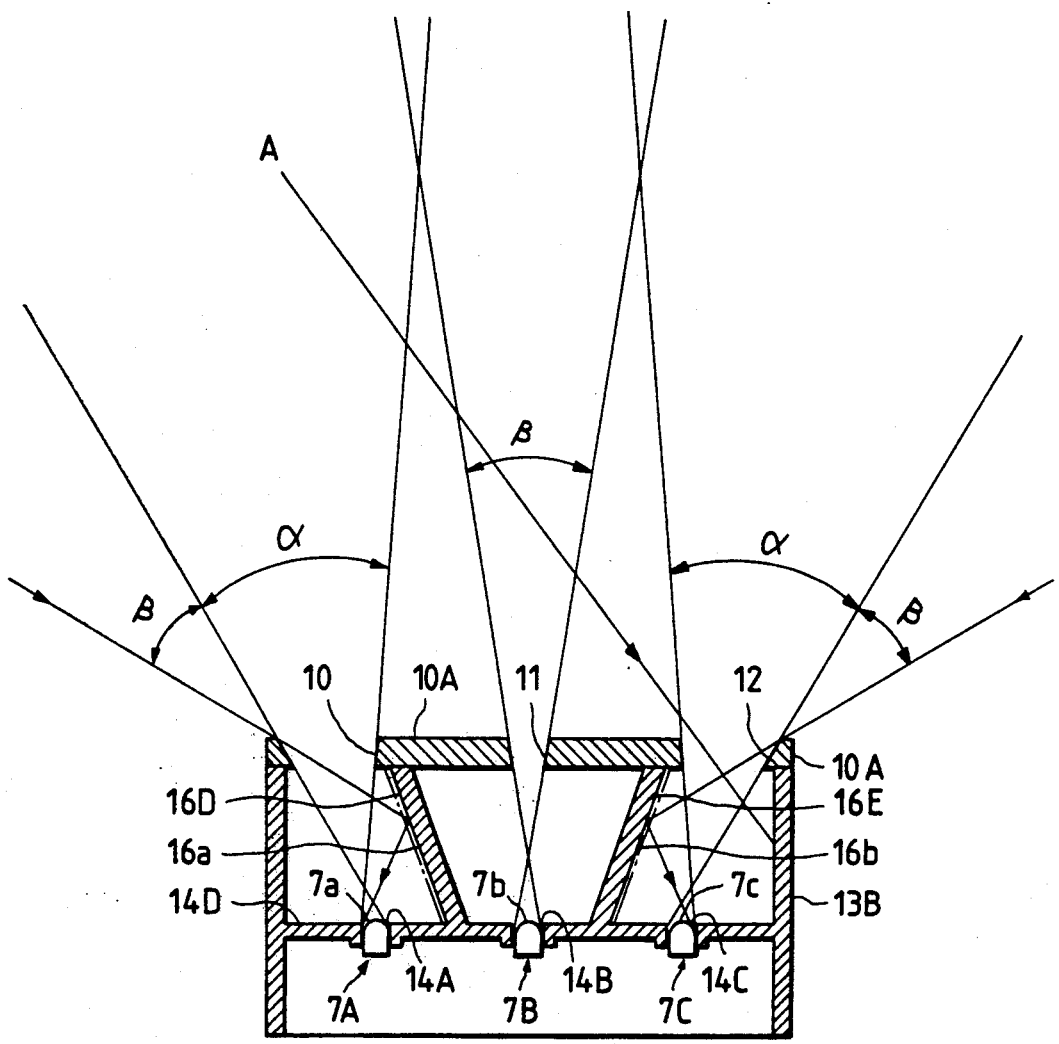
FIG. 22 is a diagram showing another embodiment in which the construction of the FIG. 18 reflector body is modified.

FIG. 22 shows another embodiment in which the construction of the reflector body 13 shown in FIG. 18 is modified.

Figure 23:
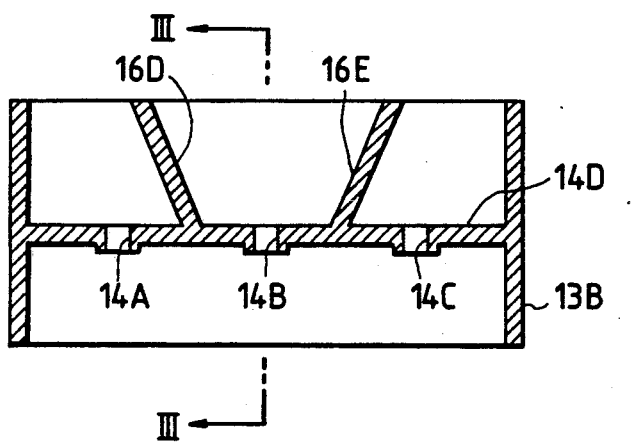
FIG. 23 is a sectional view showing the FIG. 22 reflector body.
Figure 24:
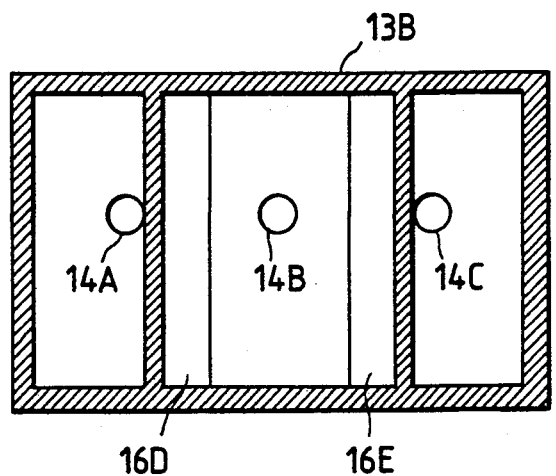
FIG. 24 is a plan view of the FIG. 23 reflector body.
Figure 25:
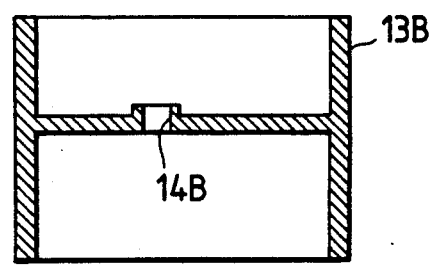
FIG. 25 is a sectional view taken along a line III—III shown in FIG. 23.
Figure 26:
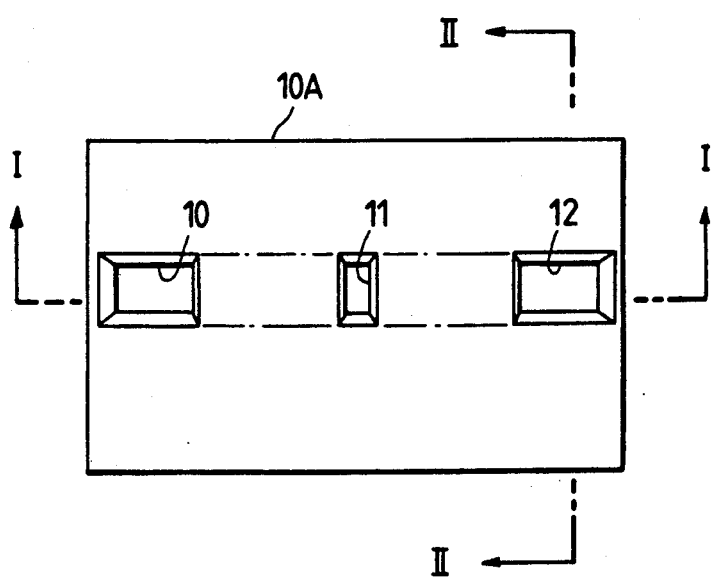
FIG. 26 is a plan view of the FIG. 22 plate.
Figure 27:
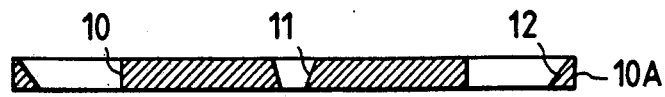
FIG. 27 is a sectional view taken along a line I—I shown in FIG. 26.
Figure 28:
FIG. 28 is a sectional view taken along a line II—II shown in FIG. 26.

As shown in FIG. 22, inside a reflector body 13B is a positioning plate 14D having positioning guides 14A, 14B, 14C (see FIGS. 23 to 25). On the positioning guides 14A, 14B, 14C are the light receiving sections 7a, 7b, 7c of the infrared light receiving units 7A, 7B, 7C. On the front of the reflector body 13B is a plate 10A shown in FIGS. 26 to 28. Slits 10, 11, 12 are formed on the plate 10A.

Here, the slits 10, 12 are formed so as to receive light rays injected from an angle $\alpha$. It is also arranged so that light rays injected from an angle $\beta$ are received by the light receiving sections 7a, 7c as they are first reflected on surfaces 16a, 16b that are processed so that light rays can reflect thereon (described later). On the other hand, the slit 11 is formed so as to receive light rays from the angle $\beta$.

Between the plate 10A and the positioning plate 14D are partition walls 16D, 16E. One surfaces 16a, 16b of the respective partition walls 16D, 16E are processed for reflection by such a process as white gloss coating or a mirror coating process. The inner surfaces of the partition walls 16D, 16E, which are opposite to the surfaces 16a, 16b, are subjected to a complementary color coating process so as to absorb light.

As a result of such arrangement, a light ray A injected from an angle other than the angles α, β is absorbed by the complementary color coated surfaces of the partition walls 16D, 16E, thereby allowing the light rays from the angles α, β to be received surely.

Thus, in this embodiment the surfaces 16a, 16b that are processed so that rays can reflect thereon are formed on the partition walls 16D, 16E, and the surfaces opposite to them are coated with complementary colors so that light rays can be absorbed.

Therefore, light rays both from the angle α and from the angle β can be received, thereby permitting effective use of the portions of the infrared light receiving units 7A, 7B, 7C which exhibit excellent sensitivity.

Figure 29:
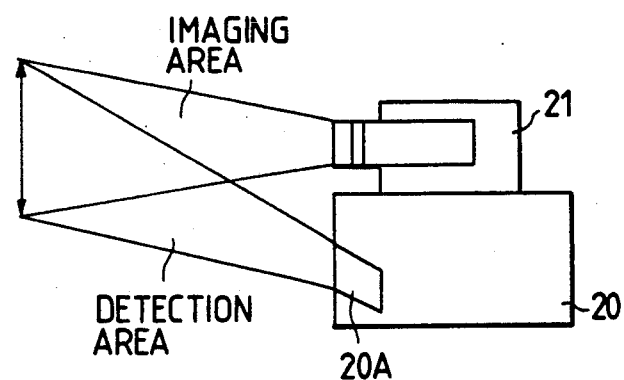
FIG. 29 is a diagram showing another embodiment in which a device for detecting the position of an object is used in combination with a video camera.
Figure 30:
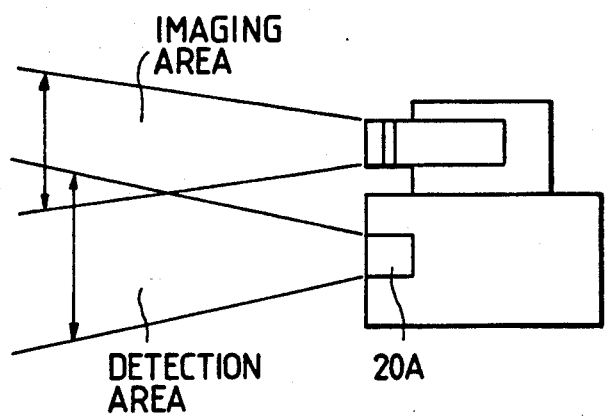
FIG. 30 is a diagram illustrative of an operation of the embodiment shown in FIG. 29.

FIG. 29 shows another embodiment in which a device for detecting an object in the above embodiments are used in combination with a video camera.

Figure 1:
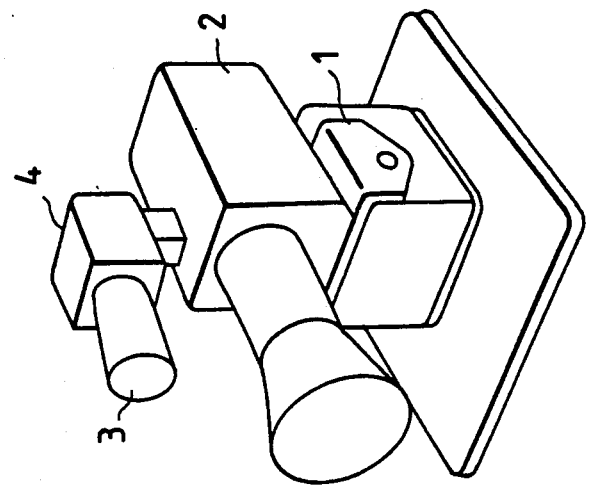
FIG. 1 is a diagram showing an exemplary conventional imaging device having a function of tracking an object to be detected (hereinafter referred to simply as "imaging device")
Figure 1:
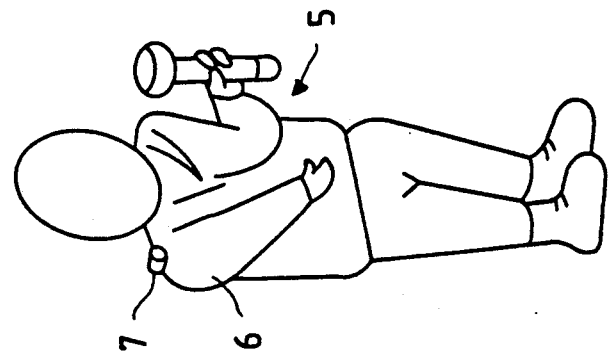

As shown in FIG. 29, a device for detecting an object 20 is disposed below a video camera 21. Below the device is a universal unit as shown in FIG. 1. A light receiving section 20A of the device 20 is arranged so as to be movable vertically and horizontally, and the direction of the light receiving plane of the light receiving section 20A is corrected to make the detection area coincide with the imaging area.

As a result of this construction, an object to be detected in the imaging area can coincide with the detection area, thereby permitting a reliable imaging by the video camera 21.

That is because, if the detection area deviates from the imaging area, such deviation results in a detection error, making the imaging unreliable.

Other embodiments of the invention will hereunder be described with reference to FIGS. 31 to 41.

Figure 31:
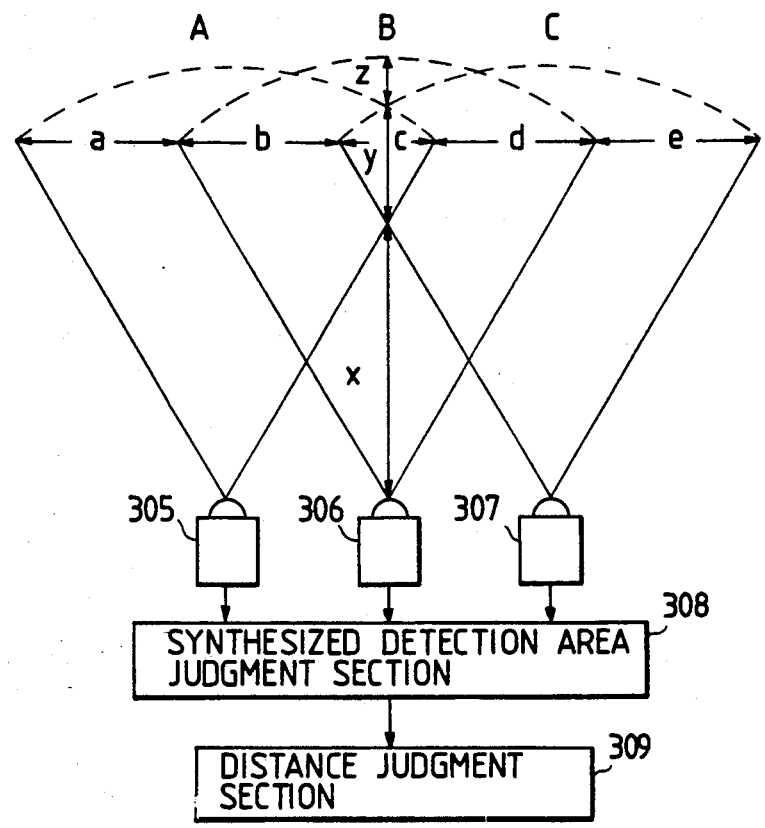
FIG. 31 is a diagram showing a device for detecting an object, which is an embodiment of the invention.

FIG. 31 shows a device for detecting an object, which is an embodiment of the invention. The device includes: light receiving units 305, 306, 307, each having a predetermined directional optical angle; a synthesized detection area judgment section 308 for judging a synthesized detection area based on the detection results of these light receiving units 305, 306, 307; and a distance judgment section 309 for judging distances x, y, z based on a judgment result by the synthesized detection area judgment section 308. The light receiving units 305, 306, 307 are arranged so that the light receiving axis of the light receiving unit 306 tracks an object to be detected (not shown) at all times. An infrared light projecting unit (not shown) is mounted on the object, and the light receiving units 305, 306, 307 receive the infrared light rays from the infrared light projecrting unit The operation of the thus constructed device is as follows.

Respective detection areas of the light receiving units 305, 306, 307 are designated as A, B, C. A synthesized detection area in which the areas A, B, C are synthesized are designated as a to e.

That is, the synthesized detection area a is an area identified when the infrared light ray is detected only by the light receiving unit 305. The synthesized detection area b is an area identified when the infrared ray is detected by the light receiving units 305, 306. The synthesized detection area c is an area identified when the infrared light ray is detected by the light receiving units 305, 306, 307. The synthesized detection area d is an area identified when the infrared light ray is detected by the light receiving units 306, 307. The synthesized detection area e is an area identified when the infrared light ray is detected only by the light receiving unit 307.

Accordingly, the device causes the light receiving axes of the light receiving units 305, 306 307 to track the object so that the object exists within the detection area B for the light receiving unit 306, the area B being equal to the areas b, c, d.

Therefore, if the infrared light from the object is detected only by the light receiving unit 306, it is judged that the distance from the detected object is either within x or z. The final judgment of the distance, either x or y, can be made when none of the light receiving units 305, 306, 307 detects the object first but only the light receiving unit 306 detects the infrared light thereafter. That is because, the light receiving level by the light receiving unit 306 at the center is larger when the object is within x than within z. Thus, it is by the difference of the light receiving level that the final judgment can be made.

If the infrared light from the object is detected by the light receiving units 305, 306, 307, the distance to the $ object is judged to be within y.

Accordingly, in this embodiment, when the synthesized detection area judgment section 308 has judged a synthesized detection area based on the detection result from the light receiving units 305, 306, 307, each of which has a predetermined directional optical angle, the distance judgment section 309 judges the distance x, y, or z based on the result by the synthesized detection area judgment section 308.

Therefore, the judgment of the distance to the object by the infrared light, which has heretofore been considered impossible, can be made on three levels: close, relatively close, and remote.

Accordingly, if the thus constructed object detecting device is used in combination with an object imaging device such as a video camera, a distance detecting sensor that has been used for focusing or a like purpose can be dispensed with, thereby contributing to implementing an inexpensive imaging device.

While the case where three light receiving units, each having a predetermined directional optical angle, are arranged has been described in this embodiment, the application of the invention is not limited thereto. Four or more light receiving units may be arranged, which allows more subtle distance judgment to be made.

Figure 32:
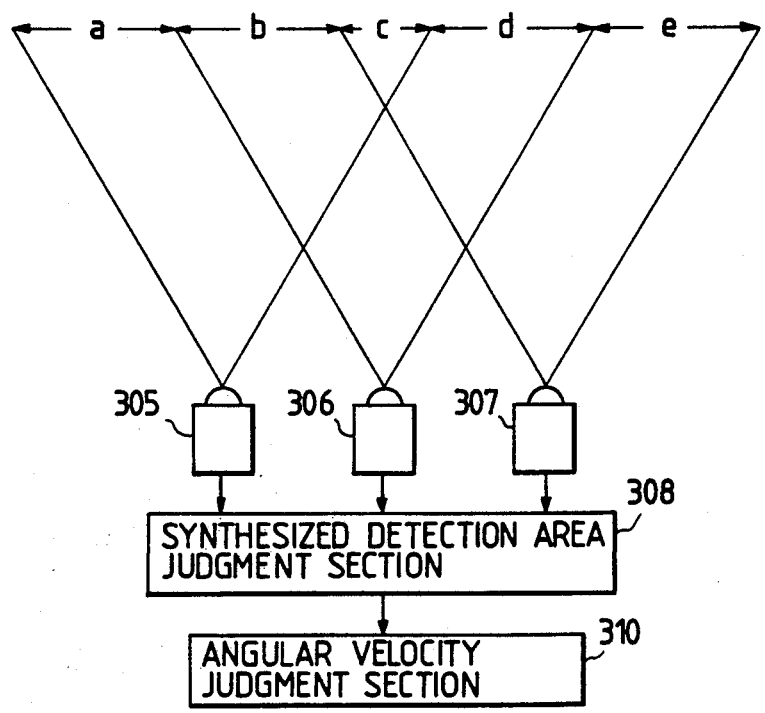
FIG. 32 is a diagram showing another embodiment in which the construction of the FIG. 31 device is modified.

FIG. 32 shows another embodiment in which the construction of the device for detecting an object shown in FIG. 31 is modified. In describing the following figures, parts and components common to those shown in FIG. 31 are designated by the same reference numerals and their description will be omitted to avoid repetition.

As shown in FIG. 32, the device includes: light receiving units 305, 306, 307; a synthesized detection area judgment section 308; an angular velocity judgment section 310 that judges the angular velocity of an object to be detected based on the result of the synthesized detection area judgment section 308.

Figure 33:
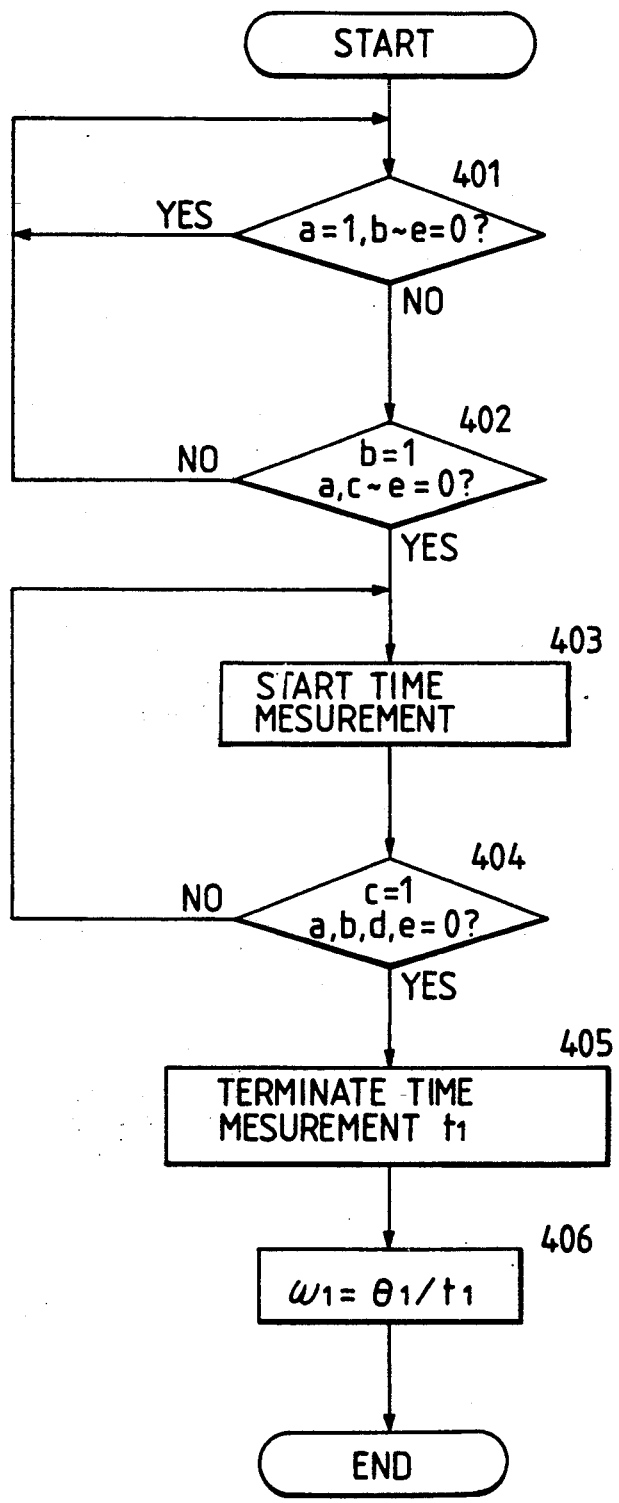
FIG. 33 is a flow chart showing an operation of the FIG. 32 device.

The operation of the thus constructed device will be described with reference to the flow chart shown in FIG. 33.

In the following flow, "1" means that the object has been detected, while "0" means that the object has not been detected.

When an infrared light ray from an object is detected by the light receiving units 305, 306, 307, synthesized detection areas a to e are judged by the synthesized detection area judgment section 308.

If, at this moment, the object is present, e.g., at the synthesized detection area a and it moves therefrom to the synthesized detection area b (Steps 401, 402), time measurement is started by the angular velocity judgment section 310 (Step 403). The time measurement continues until the object completes its movement from the synthesized detection area b to the synthesized detection area c.

And when the object is detected at the synthesized detection area c (Step (404), the time measurement is terminated. Assuming here that the measured time at this time is, e.g., t1. Successively, the angular velocity judgment section 310 calculates the angular velocity $\omega 1 = \theta 1/t1$.

Accordingly, in this embodiment, when the synthesized detection area judgment section 308 has judged the synthesized detection area a, b, c, d, or e at which the object is present based on the detection results of the light receiving units 305, 306, 307, the angular velocity judgment section 310 calculates the angular velocity $\omega 1 = \theta 1/t1$.

Incidentally, the angle of view of a video camera is, e.g., 30°, and thus the angle $\theta$ in a synthesized detection area is 6° since there are five synthesized detection areas.

The angular velocity $\omega 1$ of the object can be obtained easily. Thus, if this device is applied to the tracking of an object by an imaging device such as a video camera, the object can be tracked accurately and surely, thereby allowing the imaging device to track a moving object quickly.

Figure 34:
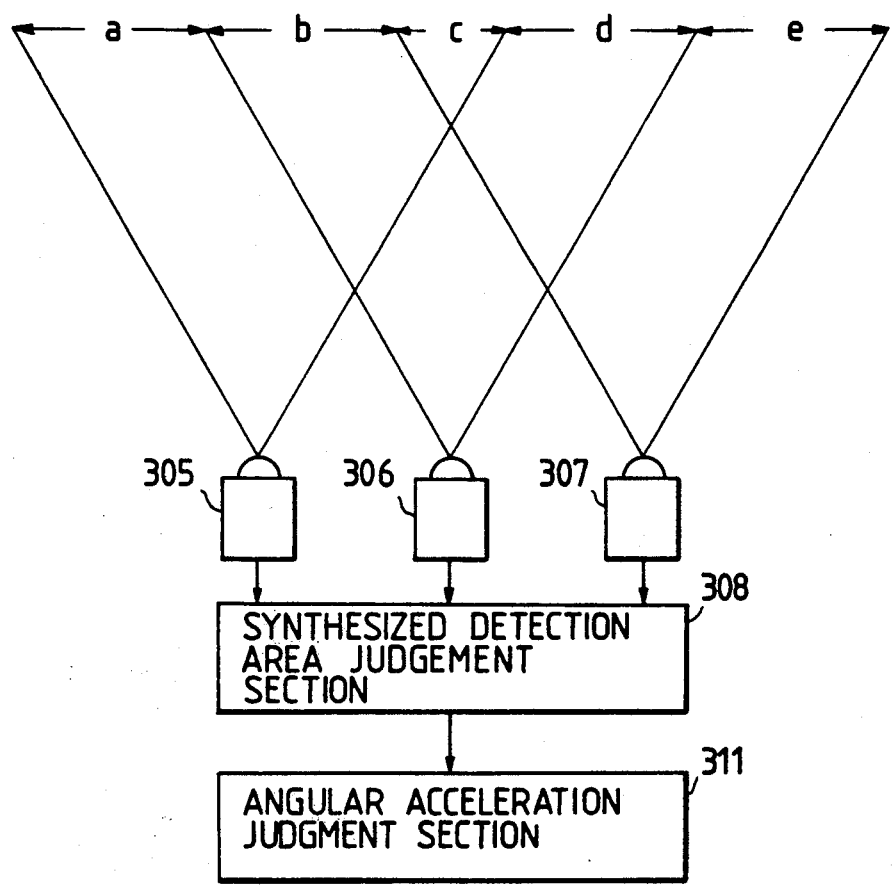
FIG. 34 is a diagram showing another embodiment in which the construction of the FIG. 32 device is modified.

FIG. 34 shows another embodiment in which the construction of the device for detecting an object shown in FIG. 32 is modified.

As shown in FIG. 34, the device includes: light receiving units 305, 306, 307; a synthesized detection area judgment section 308; and the angular acceleration judgment section 311 that judges the angular acceleration of an object to be detected based on a judgment result by the synthesized detection area judgment section 308.

Figure 35:
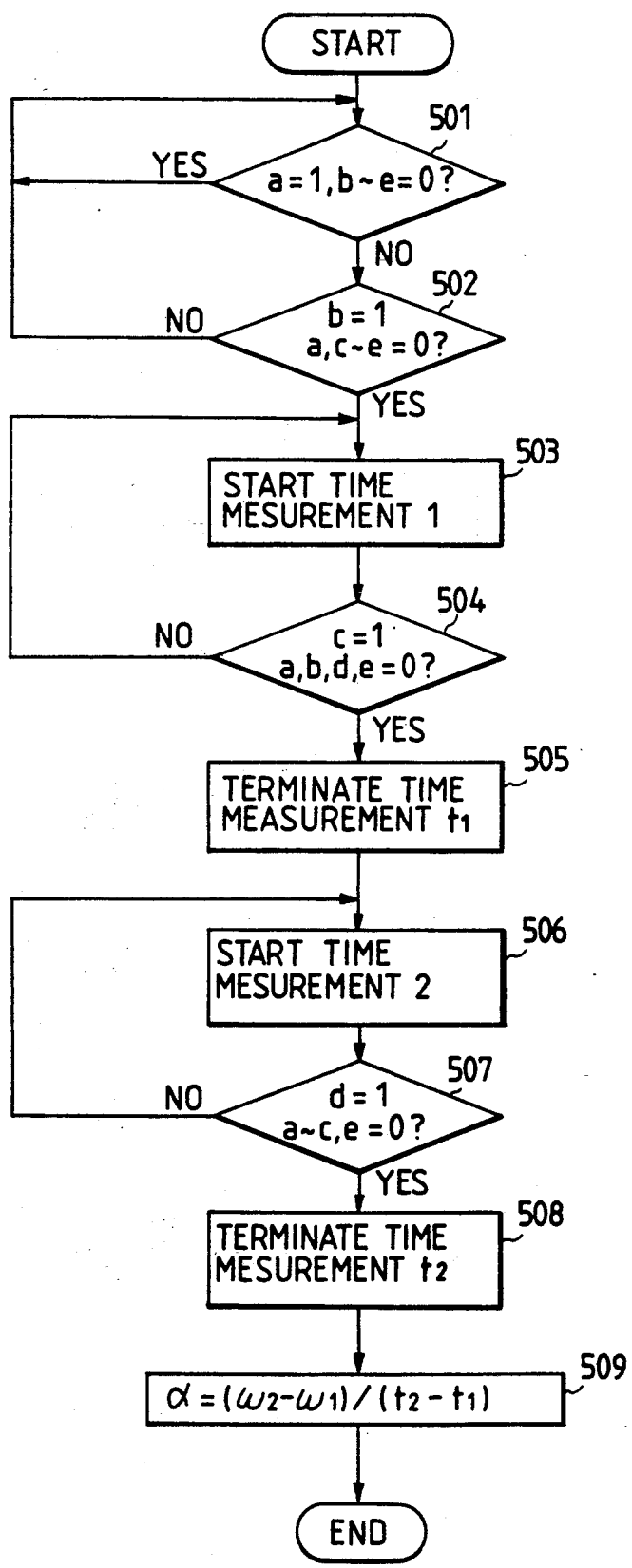
FIG. 35 is a flow chart showing an operation of the FIG. 34 device.

The operation of the thus constructed device will be described with reference to the flow chart shown in FIG. 35.

When an infrared light ray from an object is detected by the light receiving units 305, 306, 307, the synthesized detection areas a to e are judged by the synthesized detection area judgment section 308.

If, at this moment, the object is present, e.g., at the synthesized detection area a and it moves therefrom to the synthesized detection area b (Steps 501, 502), a first time measurement is started by the angular acceleration judgment section 311 (Step 503). This first time measurement is continued until the object completes its movement from the synthesized detection area b to the synthesized detection area c.

And when the object is detected at the synthesized detection area c (Step 504), the first time measurement is terminated (Step 505). Assuming here that the measured time at this time is, e.g., t1. Successively, a second time measurement is started (Step 506). This second time measurement is continued until the object completes its movement from the synthesized detection area c to the synthesized detection area d (Step 507).

Upon detection of the object at the synthesized detection area d (Step 507), the second time measurement is terminated (Step 508). Assuming that the time at this moment is, e.g., t2.

Successively, the angular acceleration judgment section 311 calculates the angular acceleration $$\alpha = (\omega 2 - \omega 1)/(t2 - t1) \text{ (Step 509).}$$

Accordingly, in this embodiment, when the synthesized detection area judgment section 308 judges the synthesized detection area a, b, c, d, or e at which the object is present based on the detection results of the light receiving units 305, 306, 307, the angular acceleration judgment section 311 calculates the angular acceleration $\alpha = (\omega 2 - \omega 1)/(t2 - t1)$.

The angular acceleration of the object can be obtained easily. Thus, if this device for detecting an object is applied to the tracking of an object by an imaging device such as a video camera, the object can be tracked accurately and surely, thereby allowing the imaging device to quickly track a moving object.

A light receiving unit of the invention will be described next.

Figure 36:
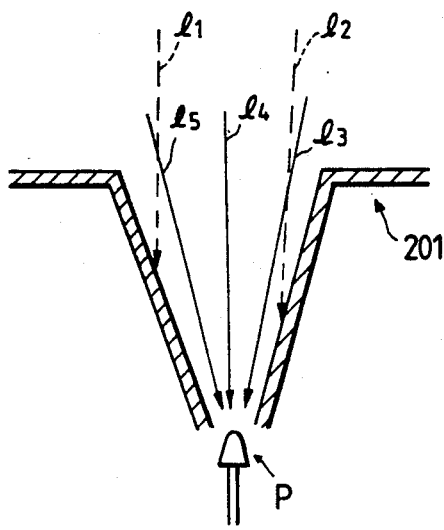
FIGS. 36 and 37 are sectional views of a light receiving unit of the invention.

According to FIG. 36, an antenna 201 of the light receiving unit is conical in section and is made of a non-reflecting member whose surface is mat or electronic wave absorbing.

Therefore, when an infrared light ray is injected to the antenna 201 in directions $l_1$, $l_2$, it strikes the inner surface of the antenna 201 which is made of a mat or electronic wave absorbing material and is absorbed by the inner surface. Thus, only infrared light rays $l_3$, $l_4$, $l_5$ can reach a light receiving element P within the antenna 201.

Figure 38:
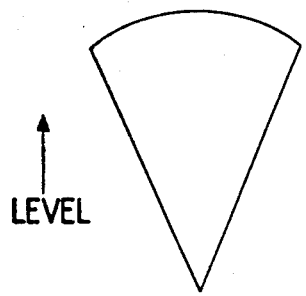
FIG. 38 is a graph showing the light receiving levels of the light receiving unit.

As a result, a directivity pattern of the light receiving unit expands in a circumferential direction uniformly as shown in FIG. 38.

Figure 41:
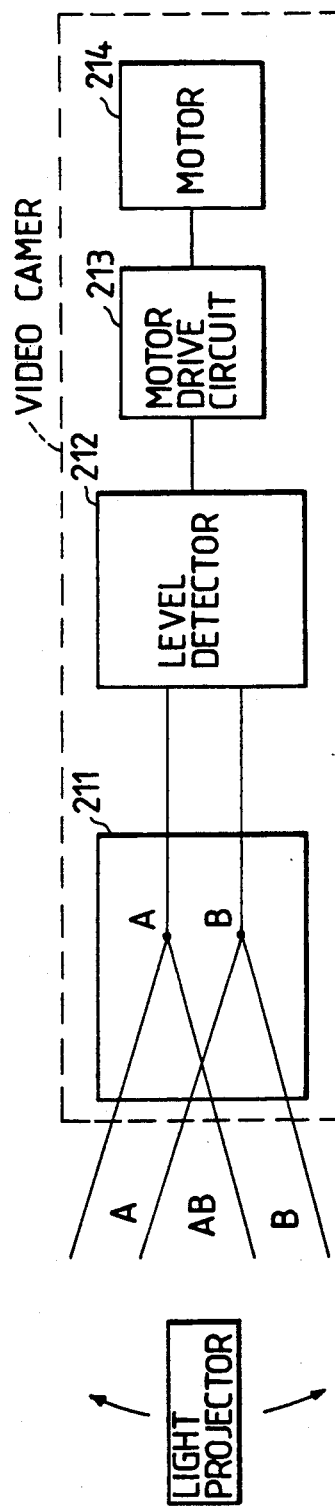
FIG. 41 is a diagram showing the construction of a video camera with a built-in light receiving unit.

An example of a video camera having the thus constructed light receiving unit 211 will be described with reference to FIG. 41.

A signal derived from a light ray received by the light receiving unit 211 is sent to a level detector 212, which identifies the position of a light projecting unit. For example, if the light projecting unit positions at $X_1$ in FIG. 40, a signal whose level is $L_A$ is detected by the level detector 212. The signal detected by the level detector 212 is sent to a motor 214 through a motor drive circuit 213. As a result, the motor 214 is driven by the motor drive circuit 213, and the video camera is thereby oriented toward $X_1$. Therefore, the video camera moves, following the position of the light projecting unit.

A second example of the antenna 201 will be described with reference to FIG. 37.

Figure 37:
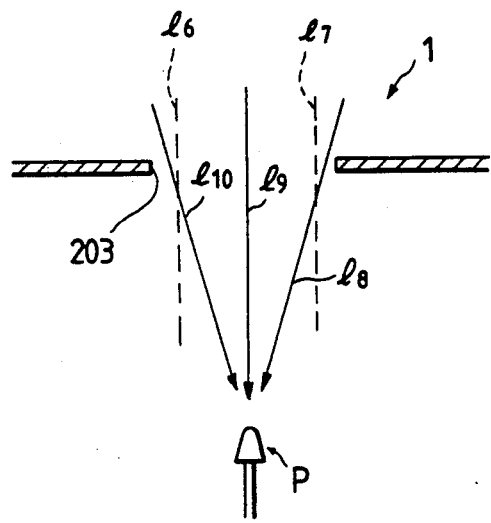

FIG. 37 is a sectional view of the antenna 201. According to this embodiment, the antenna 201 is covered with a non-reflecting member and has a hole formed as a light receiving section 203. The light receiving section 203 receives injection of only straight infrared light rays. Therefore, infrared light rays $l_6$, $l_7$ are not received by the light receiving element P, but infrared light rays $l_8$, $l_9$, $l_{10}$ are directly injected into the light receiving element P.

Figure 39:
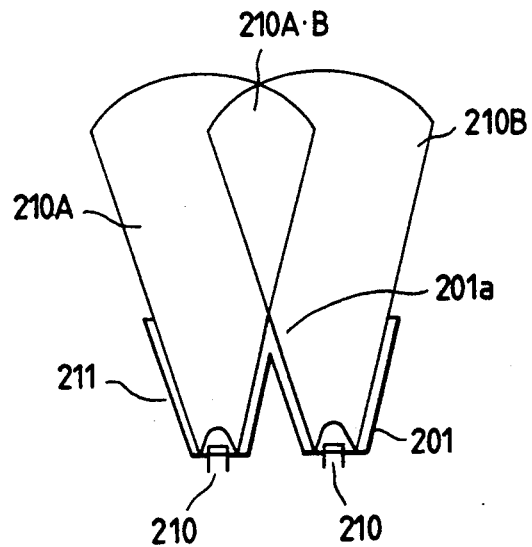
FIG. 39 is a sectional view showing the construction of a device for detecting an object in which two light receiving units are arranged.

Then, a third example in which directivity patterns of the antenna are arranged so as to overlap will be described with reference to FIG. 39.

According to this example, the antenna 201 has an inverted conical shape. In its schematic sectional view, light receiving elements 210 are arranged below the antennas, their lateral surfaces 201a being connected at an edge. The light receiving ranges of the light receiving elements 210 under such construction consist of a region 210A and a region 210B, forming an overlapping range 210A.B. As a result of the arrangement, no dead zone that has been associated with the conventional art is produced, and the position of a light projecting unit can be recognized correctly when the light projecting unit is present within the regions.

Another example of the light receiving unit 210 will be described.

Figure 40:
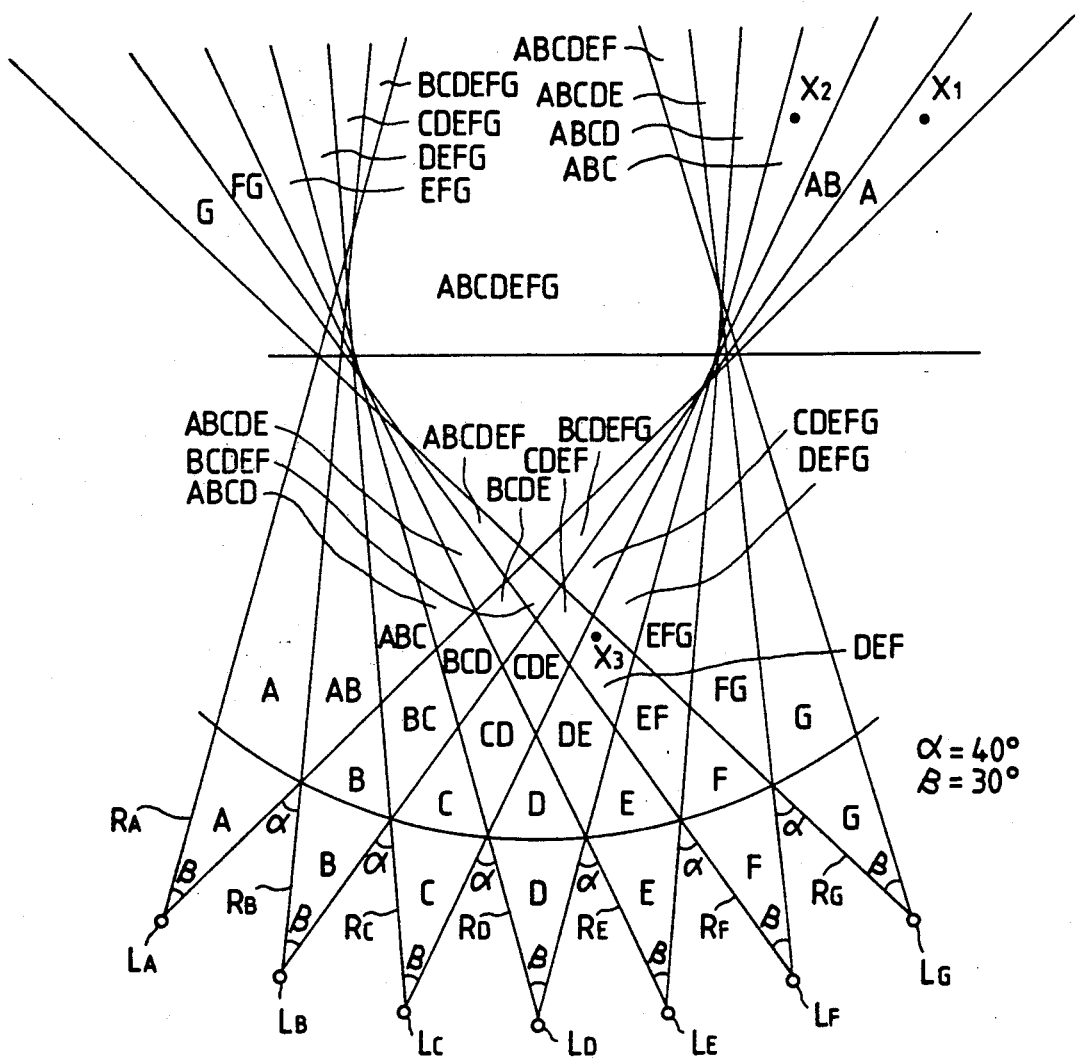
FIG. 40 is a diagram illustrative of a positional relation between the light receiving unit and a light projecting unit.

According to FIG. 40, light receiving units $R_A$, $R_B$, $R_C$, $R_D$, $R_E$, $R_F$, $R_G$ having light receiving elements $L_A$, $L_B$, $L_C$, $L_D$, $L_E$, $L_F$, $L_G$ are disposed circumferentially, the directivity of each light receiving element being the same. Here, the light receiving areas of the respective light receiving elements are designated as A, B, C, D, E, F, G. When a light projecting unit is placed within the light receiving areas of the respective light receiving units, the position of the light projecting unit can be identified.

For example, when the light projecting unit is placed within $X_1$ in an area A, an infrared light ray projected from that light projecting unit is received only by the light receiving unit $R_A$ within the area A. As a result, the area in which the light projecting unit is placed, or $X_1$, can be recognized as area A.

Also, when the light projecting unit is placed at $X_2$ within an area ABC, an infrared light ray is received by the light receiving units $R_A$, $R_B$, $R_C$, and the levels of the infrared light ray received by the light receiving units $R_A$, $R_B$, $R_C$ are detected by the level detection device 212, which judges that $X_2$ is within the area ABC.

When the light projecting unit is placed at $X_3$, an infrared light ray is received by the light receiving units $R_D$, $R_E$, $R_F$ and the region in which $X_3$ is present is judged.

While it is the construction of the light receiving unit that has mainly been described, the light receiving element may be interchanged with the light projecting element. That is, as already described with reference to FIG. 40, when a light projecting unit is placed at $R_A$, $R_B$, $R_C$, $R_D$, $R_E$, $R_F$, or $R_G$, and when a light receiving unit is placed at $X_1$, $X_2$, or $X_3$, the position of that light receiving unit can be identified.

For example, when the light receiving unit exists at $X_1$, the light receiving unit receives an infrared light ray from the light projecting unit placed at $R_4$ and thus the position of that light receiving unit can be identified.

While the case where the light receiving unit of the invention is applied to a video camera has mainly been described, it may also be applied to the automatic field correction of a stereo system, the automatic field correction of a "karaoke" system, and the automatic tracking of a spot light, a video camera, and a monitor TV.

As described in the foregoing, the device for detecting an object according to the invention divides the detection area of a light receiving plane equally, whereby the detection levels at the respective areas can be maintained constant and detection errors can thereby be eliminated. As a result, the position detection accuracy can be improved, which further allows the position of an object to be detected surely.

Further, the device of the invention allows detection of the distance to an object by an infrared light ray on, e.g., three levels: close, relatively close, and remote, such detection being considered impossible in the conventional art.

Further, the device of the invention can obtain the angular velocity of an object easily. As a result, the application of the invention to, e.g., the tracking of an object by an imaging device such as a video camera can make the tracking of the object correct and sure.

Further, the device of the invention can obtain the angular acceleration easily. As a result, the application of the invention to, e.g., the tracking of an object by an imaging device such as a video camera allows the imaging device to track the object quickly.

Therefore, the device for detecting an object according to the invention can track the presence of an object including a moving object correctly.

What is claimed is:

1. A device for detecting an object, which device detects the position of said object on the basis of receiving a light ray projected from said object by using a plurality of light receiving elements, wherein
at least two of said light receiving elements are arranged, a light receiving angle of each of said light receiving elements being set so that each of said light receiving elements has an equal length and mutually exclusive detection area on a light receiving plane.

2. A device for detecting an object according to claim 1, wherein said light receiving elements are disposed on a reflector body having slits, and said detection area on said light receiving plane is divided equally by said slits.

3. A device for detecting an object according to claim 2, wherein said light receiving elements are disposed on said reflector body through light receiving units, each of said light receiving units being generally parabolic in shape.

4. A device for detecting an object according to claim 3, wherein said slit shuttles between a predetermined area on a time sharing basis.

5. A device for detecting an object according to claim 2, wherein said slit shuttles between a predetermined area on a time sharing basis.

6. A device for detecting an object according to claim 2, wherein said reflector body is rectangular shaped; the interior thereof is partitioned by partition walls; and each of partitioned areas accommodates a single light receiving element.

7. A device for detecting an object, which device detects said object by detecting a light ray projected from said object, said device comprising:
a plurality of light receiving means, each having a predetermined directional optical angle for receiving said infrared light ray;
synthesized detection area forming means for forming a plurality of synthesized detection areas obtained by synthesizing the light receiving areas of said plurality of light receiving means, said synthesized detection areas including one area which involves the detection area of only one of said plurality of light receiving means, and another area which includes the detection area of only two of said plurality of light receiving means;
synthesized detection area judgment means for judging a synthesized detection area based on detection results by said plurality of light receiving means, and
distance judgment means for judging a distance to said object based on a judgment result by said synthesized detection area judgment means.

8. A device for detecting an object, which device detects the presence of said object by detecting a light ray projected from said object, said device comprising:
- a plurality of light receiving means, each having a predetermined directional optical angle for receiving said infrared light ray;
- synthesized detection area forming means for forming a plurality of synthesized detection areas obtained by synthesizing the light receiving areas of said plurality of light receiving means, said synthesized detection areas including one area which involves the detection area of only one of said plurality of light receiving means, and another area which includes the detection area of only two of said plurality of light receiving means;
- synthesized detection area judgment means for judging a synthesized detection area based on detection results by said plurality of light receiving means; and
- angular velocity judgment means for judging an angular velocity of said object based on a judgment result by said synthesized detection area judgment means.

9. A device for detecting an object, which device detects the presence of said object by receiving a light ray projected from said object, said device comprising:
- a plurality of light receiving means, each having a predetermined directional optical angle for receiving said infrared light ray;
- synthesized detection area forming means for forming a plurality of synthesized detection areas obtained by synthesizing the light receiving areas of said plurality of light receiving means, said synthesized detection areas including one area which involves the detection area of only one of said plurality of light receiving means, and another area which includes the detection area of only two of said plurality of light receiving means;
- synthesized detection area judgment means for judging a synthesized detection area based on detection results by said plurality of light receiving means, and
- angular acceleration judgment means for judging an angular acceleration to said object based on a judgment result by said synthesized detection area judgment means.

10. A device for receiving light rays, comprising a plurality of light receiving units, each having the same directivity, being disposed adjacent to one another so that the light receiving ranges thereof overlap one upon the other, and each unit having an inverted conical shaped antenna, wherein a lateral surface thereof is connected to a lateral surface of an antenna of an adjacent unit.

11. A device for receiving light rays according to claim 10, wherein each of said plurality of light receiving units has a non-reflecting receiver absorbing an infrared light ray and receives only a directly infrared light ray with a light receiving element disposed within said light receiving unit.

12. A device for receiving light rays according to claim 10, wherein each of said plurality of light receiving units is so arranged that a portion surrounding said light receiving element is covered with a non-reflecting member absorbing an infrared light ray so as to receive only a straight infrared light ray from a light projecting unit and that a light receiving hole is disposed on said non-reflecting member.

* * * * *